US009182815B2

(12) United States Patent
Small et al.

(10) Patent No.: US 9,182,815 B2
(45) Date of Patent: Nov. 10, 2015

(54) MAKING STATIC PRINTED CONTENT DYNAMIC WITH VIRTUAL DATA

(75) Inventors: Sheridan Martin Small, Seattle, WA (US); Alex Aben-Athar Kipman, Redmond, WA (US); Benjamin I. Vaught, Seattle, WA (US); Kathryn Stone Perez, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 260 days.

(21) Appl. No.: 13/313,368

(22) Filed: Dec. 7, 2011

(65) Prior Publication Data

US 2013/0147836 A1    Jun. 13, 2013

(51) Int. Cl.
*G09G 5/00* (2006.01)
*G06F 3/01* (2006.01)

(52) U.S. Cl.
CPC ............... *G06F 3/011* (2013.01); *G06F 3/013* (2013.01); *G06F 3/017* (2013.01)

(58) Field of Classification Search
CPC ....... G06T 19/006; G06T 19/00; G06F 3/011; G06F 3/012; G06F 3/0304
USPC .................... 345/7–8, 632–633; 715/757, 863
See application file for complete search history.

(56) References Cited

U.S. PATENT DOCUMENTS

| 5,954,515 A | 9/1999 | Iggulden |
| 6,175,343 B1 | 1/2001 | Mitchell et al. |
| 6,266,057 B1 | 7/2001 | Kuzunuki et al. |
| 6,408,257 B1 | 6/2002 | Harrington et al. |
| 6,427,140 B1 * | 7/2002 | Ginter et al. ..................... 705/80 |
| 6,457,024 B1 | 9/2002 | Felsentein et al. |
| 6,466,975 B1 | 10/2002 | Sterling |
| 6,590,996 B1 | 7/2003 | Reed et al. |

(Continued)

FOREIGN PATENT DOCUMENTS

| CN | 1568453 | 1/2005 |
| CN | 102142005 | 8/2011 |

(Continued)

OTHER PUBLICATIONS

Liarokapis, Fotis, "An Augmented Reality Interface for Visualizing and Interacting with Virtual Content", Draft Paper to Appear in Journal of Virtual Reality, vol. 11, Issue 1, Feb. 2007, 18 pages.

(Continued)

*Primary Examiner* — Todd Buttram
(74) *Attorney, Agent, or Firm* — Judy Yee; Micky Minhas

(57) ABSTRACT

The technology provides embodiments for making static printed content being viewed through a see-through, mixed reality display device system more dynamic with display of virtual data. A printed content item, for example a book or magazine, is identified from image data captured by cameras on the display device, and user selection of a printed content selection within the printed content item is identified based on physical action user input, for example eye gaze or a gesture. A task in relation to the printed content selection can also be determined based on physical action user input. Virtual data for the printed content selection is displayed in accordance with the task. Additionally, virtual data can be linked to a work embodied in a printed content item. Furthermore, a virtual version of the printed material may be displayed at a more comfortable reading position and with improved visibility of the content.

13 Claims, 22 Drawing Sheets

(56) References Cited

U.S. PATENT DOCUMENTS

| | | | |
|---|---|---|---|
| 6,788,293 | B1 | 9/2004 | Silverbrook et al. |
| 6,947,219 | B1 | 9/2005 | Ou |
| 7,289,130 | B1* | 10/2007 | Satoh et al. ............... 345/629 |
| 7,372,451 | B2 | 5/2008 | Dempski |
| 7,509,570 | B2 | 3/2009 | Narusawa |
| 7,774,075 | B2* | 8/2010 | Lin ............................. 700/17 |
| 7,837,094 | B2 | 11/2010 | Rhoads |
| 7,848,573 | B2* | 12/2010 | Wecker et al. ............. 382/186 |
| 7,969,383 | B2* | 6/2011 | Eberl et al. ..................... 345/7 |
| 2003/0043144 | A1* | 3/2003 | Pundarika et al. ........... 345/419 |
| 2003/0059762 | A1 | 3/2003 | Fujiwara et al. |
| 2004/0008368 | A1 | 1/2004 | Plunkett et al. |
| 2004/0104935 | A1* | 6/2004 | Williamson et al. ......... 345/757 |
| 2005/0143172 | A1* | 6/2005 | Kurzweil ..................... 463/30 |
| 2006/0028400 | A1 | 2/2006 | Lapstun et al. |
| 2006/0122905 | A1* | 6/2006 | Marshall et al. ............ 705/26 |
| 2006/0141436 | A1 | 6/2006 | Rines |
| 2006/0150848 | A1 | 7/2006 | Deutsch |
| 2006/0244677 | A1 | 11/2006 | Dempski |
| 2007/0005795 | A1 | 1/2007 | Gonzalez |
| 2007/0093169 | A1 | 4/2007 | Blaszczyk et al. |
| 2007/0104036 | A1 | 5/2007 | Prax et al. |
| 2007/0157080 | A1 | 7/2007 | Wadsworth et al. |
| 2007/0226321 | A1 | 9/2007 | Bengtson |
| 2007/0285338 | A1 | 12/2007 | Yanagisawa |
| 2008/0266323 | A1 | 10/2008 | Biocca et al. |
| 2009/0243967 | A1 | 10/2009 | Kato |
| 2009/0243968 | A1 | 10/2009 | Nakazawa |
| 2009/0278766 | A1 | 11/2009 | Sako et al. |
| 2010/0048242 | A1 | 2/2010 | Rhoads et al. |
| 2010/0111405 | A1 | 5/2010 | Lee et al. |
| 2010/0149073 | A1* | 6/2010 | Chaum et al. ................. 345/8 |
| 2010/0199232 | A1* | 8/2010 | Mistry et al. ................ 715/863 |
| 2010/0208302 | A1 | 8/2010 | Lee |
| 2011/0018903 | A1 | 1/2011 | Lapstun et al. |
| 2011/0029443 | A1 | 2/2011 | King et al. |
| 2011/0081867 | A1 | 4/2011 | Issa et al. |
| 2011/0096401 | A1* | 4/2011 | Levola .......................... 359/573 |
| 2011/0141511 | A1 | 6/2011 | Milanski et al. |
| 2011/0148924 | A1* | 6/2011 | Tapley et al. ................ 345/634 |
| 2011/0167350 | A1 | 7/2011 | Hoellwarth |
| 2011/0181497 | A1* | 7/2011 | Raviv ............................. 345/8 |
| 2011/0187744 | A1* | 8/2011 | Kim et al. .................... 345/633 |
| 2011/0195388 | A1 | 8/2011 | Henshall et al. |
| 2011/0205474 | A1 | 8/2011 | Corriveau et al. |
| 2011/0213664 | A1 | 9/2011 | Osterhout et al. |
| 2011/0216091 | A1* | 9/2011 | Song et al. ................... 345/634 |
| 2011/0261030 | A1 | 10/2011 | Bullock |
| 2011/0279479 | A1* | 11/2011 | Rodriguez .................... 345/633 |
| 2011/0288964 | A1* | 11/2011 | Linder et al. ................. 705/27.1 |
| 2011/0316806 | A1* | 12/2011 | Lapstun et al. .............. 345/173 |
| 2012/0001923 | A1 | 1/2012 | Weinzimmer et al. |
| 2012/0064204 | A1 | 3/2012 | Davila et al. |
| 2012/0088543 | A1 | 4/2012 | Lindner et al. |
| 2012/0154557 | A1 | 6/2012 | Perez et al. |
| 2012/0188148 | A1 | 7/2012 | DeJong |
| 2012/0188279 | A1* | 7/2012 | Demaine ...................... 345/633 |
| 2012/0249831 | A1 | 10/2012 | Porter |
| 2012/0320092 | A1 | 12/2012 | Shin et al. |
| 2012/0324493 | A1 | 12/2012 | Holmdahl et al. |
| 2013/0016102 | A1* | 1/2013 | Look et al. ................... 345/426 |
| 2013/0044128 | A1 | 2/2013 | Liu et al. |
| 2013/0044129 | A1 | 2/2013 | Latta et al. |
| 2013/0044130 | A1 | 2/2013 | Geisner et al. |
| 2013/0046616 | A1 | 2/2013 | Williams et al. |
| 2013/0050432 | A1* | 2/2013 | Perez et al. .................. 348/47 |
| 2013/0054576 | A1 | 2/2013 | Karmarkar et al. |
| 2013/0057891 | A1 | 3/2013 | Aoki |
| 2013/0076788 | A1 | 3/2013 | Zvi |
| 2013/0083003 | A1 | 4/2013 | Perez et al. |
| 2013/0083333 | A1 | 4/2013 | Lopez et al. |
| 2013/0169682 | A1 | 7/2013 | Novak et al. |
| 2013/0235347 | A1 | 9/2013 | Hennessey et al. |
| 2013/0298030 | A1 | 11/2013 | Nahumi et al. |

FOREIGN PATENT DOCUMENTS

| | | |
|---|---|---|
| EP | 1060772 | 12/2000 |
| JP | 07177442 | 7/1995 |
| JP | 2001154637 | 6/2001 |
| JP | 2004133784 | 4/2004 |
| JP | 2007200261 | 8/2007 |
| JP | 2007214964 | 8/2007 |
| KR | 20000032647 | 6/2000 |
| KR | 20090036183 | 4/2009 |
| KR | 20090060421 | 6/2009 |
| KR | 20100067155 | 6/2010 |
| WO | 0167214 | 9/2001 |

OTHER PUBLICATIONS

Veltman, Kim H., "Augmented Books, Knowledge, and Culture", In Proceedings of INET'2000, Jul. 2000, 93 pages.

U.S. Appl. No. 13/346,674, filed Jan. 9, 2012.

U.S. Appl. No. 13/347,576, filed Jan. 10, 2012.

U.S. Appl. No. 13/485,627, filed May 31, 2012.

Asai, et al., "Augmented Instructions—A Fusion of Augmented Reality and Printed Learning Materials", Proceedings of the Fifth IEEE International Conference on Advanced Learning Technologies, IEEE Computer Society, Jul. 5-8, 2005, pp. 213-215. 3 pages.

Biggs, John, "CMU Researchers Turn Any Surface Into a Touchscreen," TechCrunch [online], Oct. 17, 2011 [retrieved on Oct. 21, 2011], Retrieved from the Internet: <URL:http://techcrunch.com/2011/10/17/cmu-researchers-turn-any-surface-into-a-touchscreen/>, 6 pages.

Billinghurst et al., "MagicBook: Transitioning between Reality and Virtuality," Proceedings of the 2001 Conference on Human Factors in Computing Systems (CHI '01), Mar. 31-Apr. 5, 2001, Seattle, WA, USA. 2 pages.

Card, et al., "3Book: A Scalable 3D Virtual Book," Proceedings of the 2004 Conference on Human Factors in Computing Systems (CHI '04), Apr. 24-29, 2004, in Vienna, Austria, ACM, 4 pages.

Dachselt, et al., "Interacting with Printed Books Using Digital Pens and Smart Mobile Projection," Proceedings of the Workshop on Mobile and Personal Projection (MP$^2$) (CHI '11), ACM, Vancouver, Canada, May 7-12, 2011, 5 pages.

Grasset, et al., "Edutainment with a Mixed Reality Book: A Visually Augmented Illustrative Childrens' Book," Proceedings of the International Conference on Advances in Computer Entertainment Technology, 2008, pp. 292-295, 4 pages.

Grasset, et al., "The Design of a Mixed-Reality Book: Is It Still a Real Book?," Proceedings of the 7th IEEE/ACM International Symposium on Mixed and Augmented Reality, Sep. 15-18, 2008, pp. 99-102, 4 pages.

Hanheide, Marc, "A Cognitive Ego-Vision System for Interactive Assistance", Bielefeld University, Oct. 2006, 198 pages.

Hong, et al., "Annotating 3D Electronic Books," Proceedings of the Conference on Human Factors in Computing Systems (CHI '05), Apr. 2-7, 2005, in Portland, Oregon, ACM, 4 pages.

Weibel et al., "PaperProof: A Paper-Digital Proof-Editing System," Proceedings of the 2008 Conference on Human Factors in Computing Systems (CHI '08), Apr. 5-10, 2008, Florence, Italy, 13 pages.

Wu, et al., "Turning a Page on the Digital Annotation of Physical Books," Proceedings of the 2nd International Conference on Tangible and Embedded Interaction, Feb. 18-20, 2008, Bonn, Germany, ACM, 8 pages.

International Search Report and Written Opinion dated Mar. 18, 2013 in International Patent Application No. PCT/US2012/067647, 8 pages.

English abstract for JP2007200261 published Aug. 9, 2007.

International Search Report and Written Opinion dated Mar. 22, 2013 in International Patent Application No. PCT/US2012/067805, 7 pages.

English abstract for KR20000032647 published Jun. 15, 2000.

English abstract for KR20090036183 published Apr. 14, 2009.

International Search Report and Written Opinion dated Mar. 22, 2013 in International Patent Application No. PCT/US2012/067806, 7 pages.

English abstract for JP07177442 published Jul. 14, 1995.

(56) References Cited

OTHER PUBLICATIONS

English abstract for JP2001154637 published Jun. 8, 2001.
English abstract for JP2007214964 published Aug. 23, 2007.
English abstract for KR20090060421 published Jun. 12, 2009.
Office Action dated Nov. 7, 2013 in U.S. Appl. No. 13/346,674, 43 pages.
Office Action dated Oct. 23, 2013 in U.S. Appl. No. 13/347,576, 149 pages.
Response to Office Action filed Mar. 7, 2014 in U.S. Appl. No. 13/346,674, 14 pages.
Response to Office Action filed Mar. 23, 2014 in U.S. Appl. No. 13/347,576, 14 pages.
Office Action dated Apr. 14, 2014 in U.S. Appl. No. 13/485,627, 110 pages.
Office Action dated Jun. 2, 2014 in U.S. Appl. No. 13/346,674, 32 pages.
Office Action dated Jun. 3, 2014 in U.S. Appl. No. 13/347,576, 28 pages.
Bell et al., View Management for Virtual and Augmented Reality, UIST 2001 (ACM Symp. on User Interface Software and Technology), Orlando, FL, Nov. 11-14, 2001, pp. 101-110, 10 pages.
Published Korean Patent Application Publication KR20100067155 with machine translation, published Jun. 21, 2010, 18 pages.
English Abstract of JP Patent Application Publication JP2004133784, published Apr. 30, 2004, 2 pages.
Response to Office Action filed Aug. 13, 2014 in U.S. Appl. No. 13/485,627, 14 pages.
Office Action dated Oct. 24, 2014 in U.S. Appl. No. 13/485,627, 52 pages.
Response to Final Office Action filed Dec. 1, 2014 in U.S. Appl. No. 13/346,674, 14 pages.
Response to Final Office Action filed Dec. 2, 2014 in U.S. Appl. No. 13/347,576, 26 pages.
Office Action dated Jan. 5, 2015 in U.S. Appl. No. 13/346,674.
Response to Final Office Action filed Jan. 23, 2015 in U.S. Appl. No. 13/485,627.
Notice of Allowances and Fee(s) Due dated Feb. 3, 2015 in U.S. Appl. No. 13/485,627.
Notice of Allowance and Fee(s) Due dated Jan. 30, 2015 in U.S. Appl. No. 13/347,576.
Final Office Action dated May 27, 2015 in U.S. Appl. No. 13/346,674.
Notice of Allowance and Fee(s) Due dated May 27, 2015 in U.S. Appl. No. 13/347,576.
Notice of Allowance and Fee(s) Due dated Feb. 27, 2015 in U.S. Appl. No. 13/485,627.
"First Office Action and Search Report Issued in Chinese Patent Application No. 201210526353.6", with partial English translation, Mailed Date: Apr. 3, 2015, 17 Pages.
"First Office Action and Search Report Issued in Chinese Patent Application No. 201210525621.2", with partial English translation, Mailed Date: Apr. 3, 2015, 18 Pages.
Response Office Action filed Apr. 6, 2015 in U.S. Appl. No. 13/346,674.
First Office Action and Search Report, with partial English translation, dated May 5, 2015 in Chinese Patent Application No. 201210520999.3.
Response to Final Office Action filed Jul. 23, 2015 in U.S. Appl. No. 13/346,674.
Notice of Allowance and Fee(s) Due dated Aug. 28, 2015 in U.S. Appl. No. 13/346,674.

\* cited by examiner

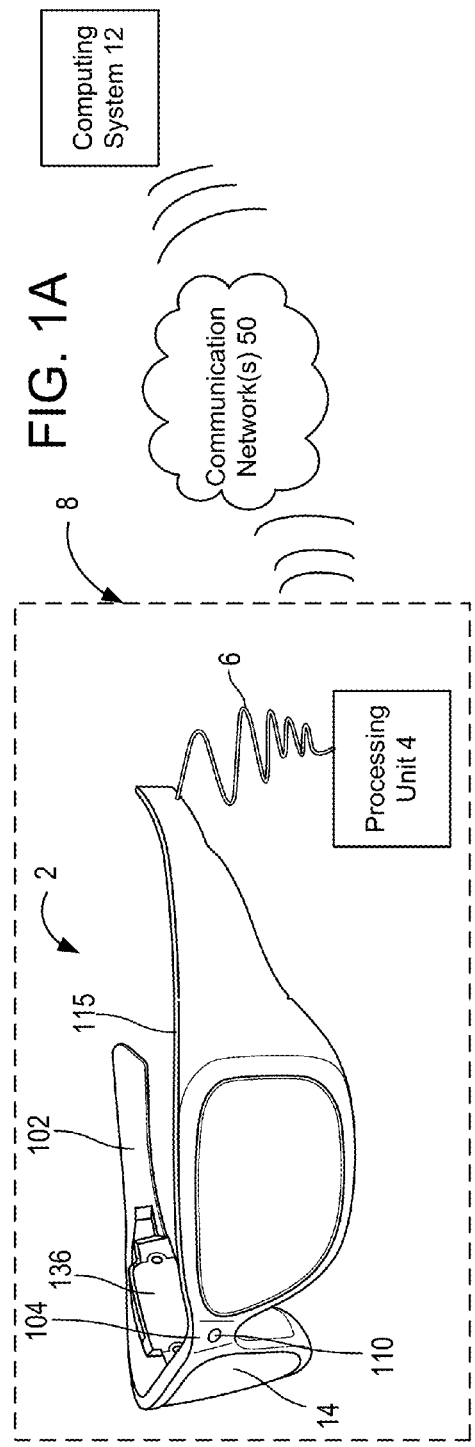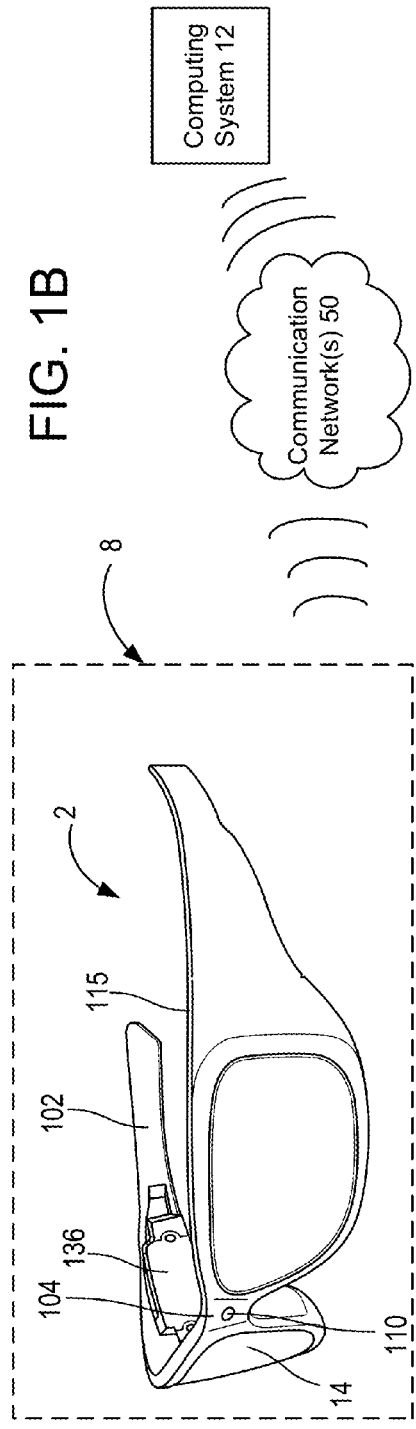

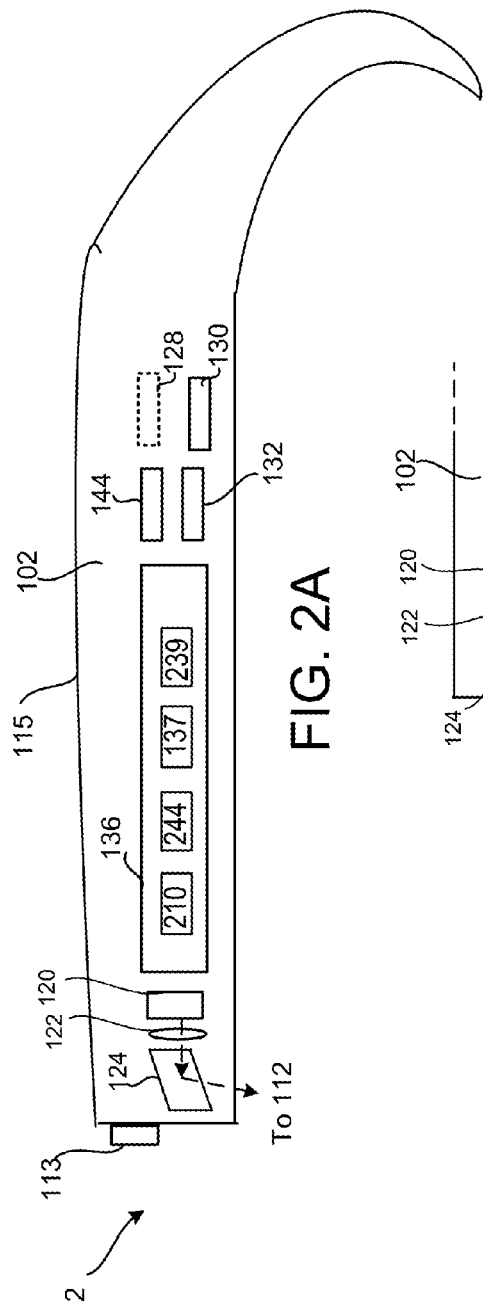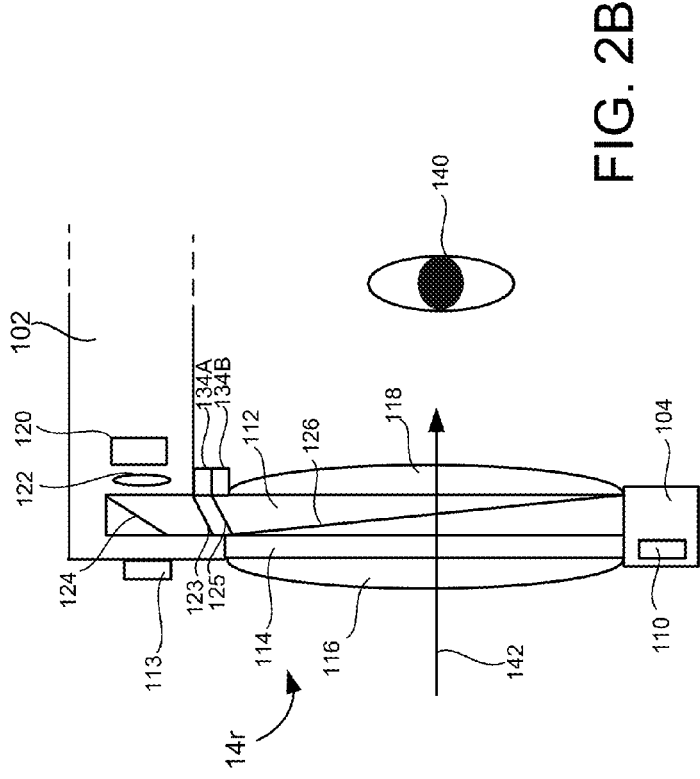

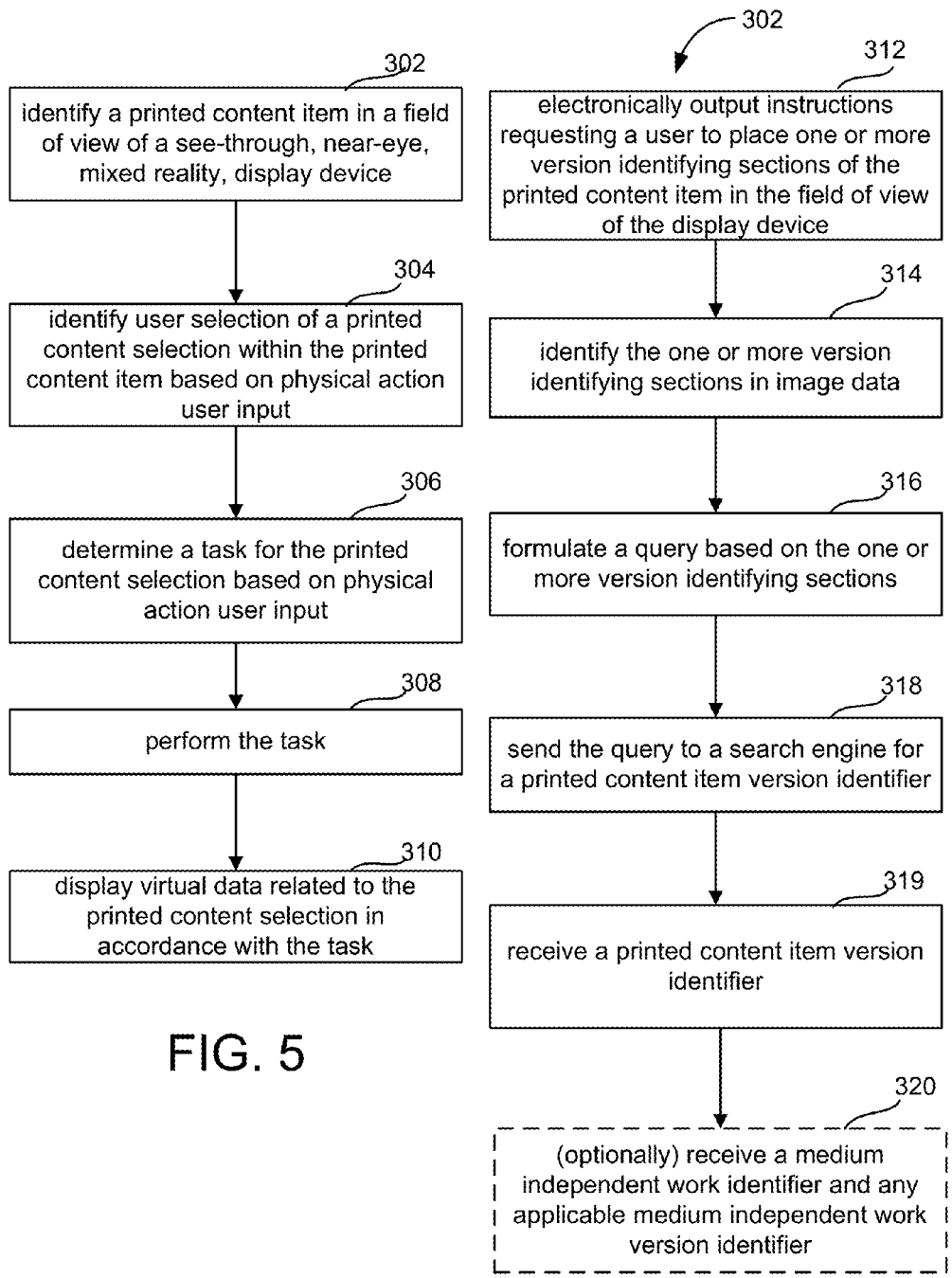

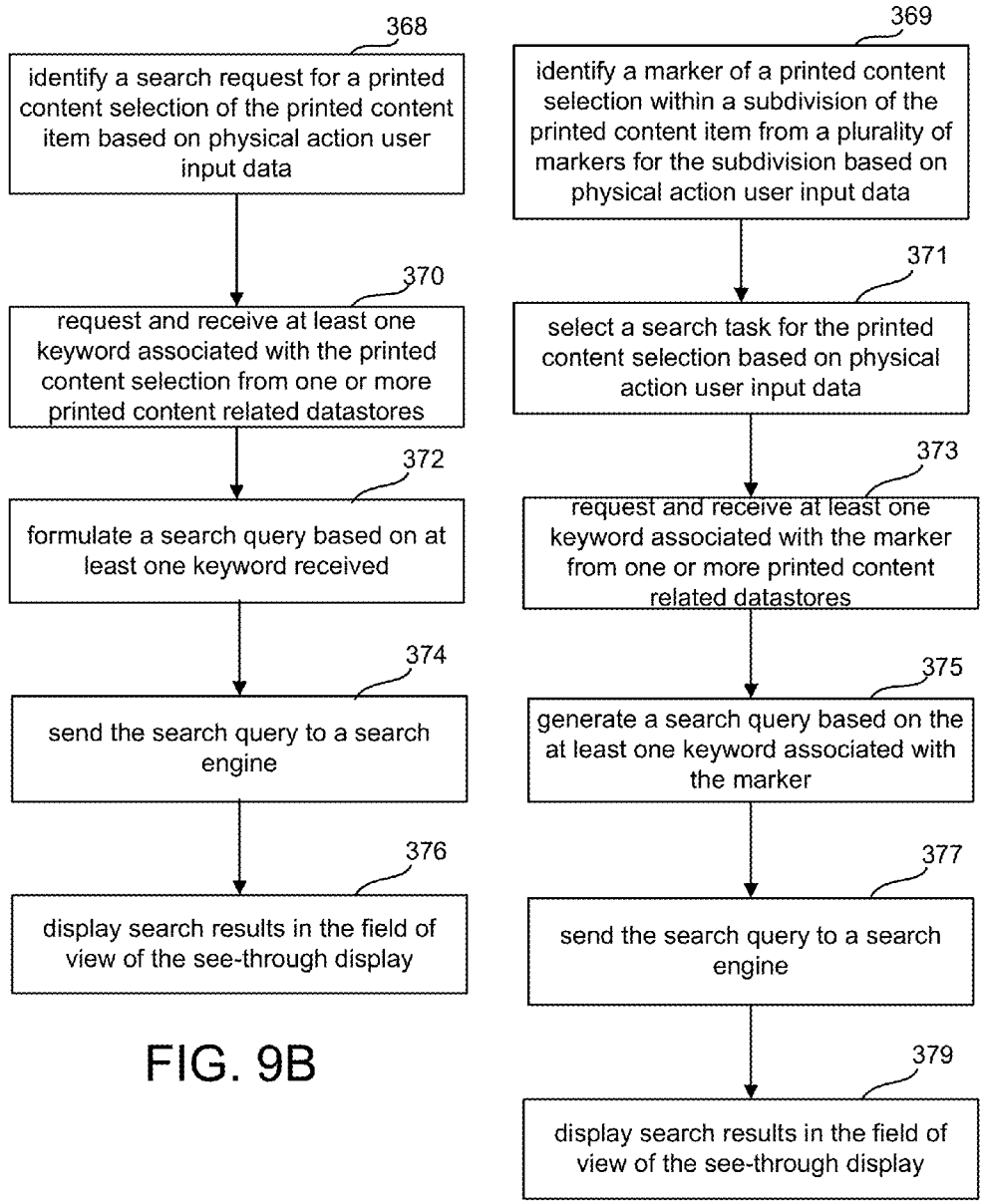

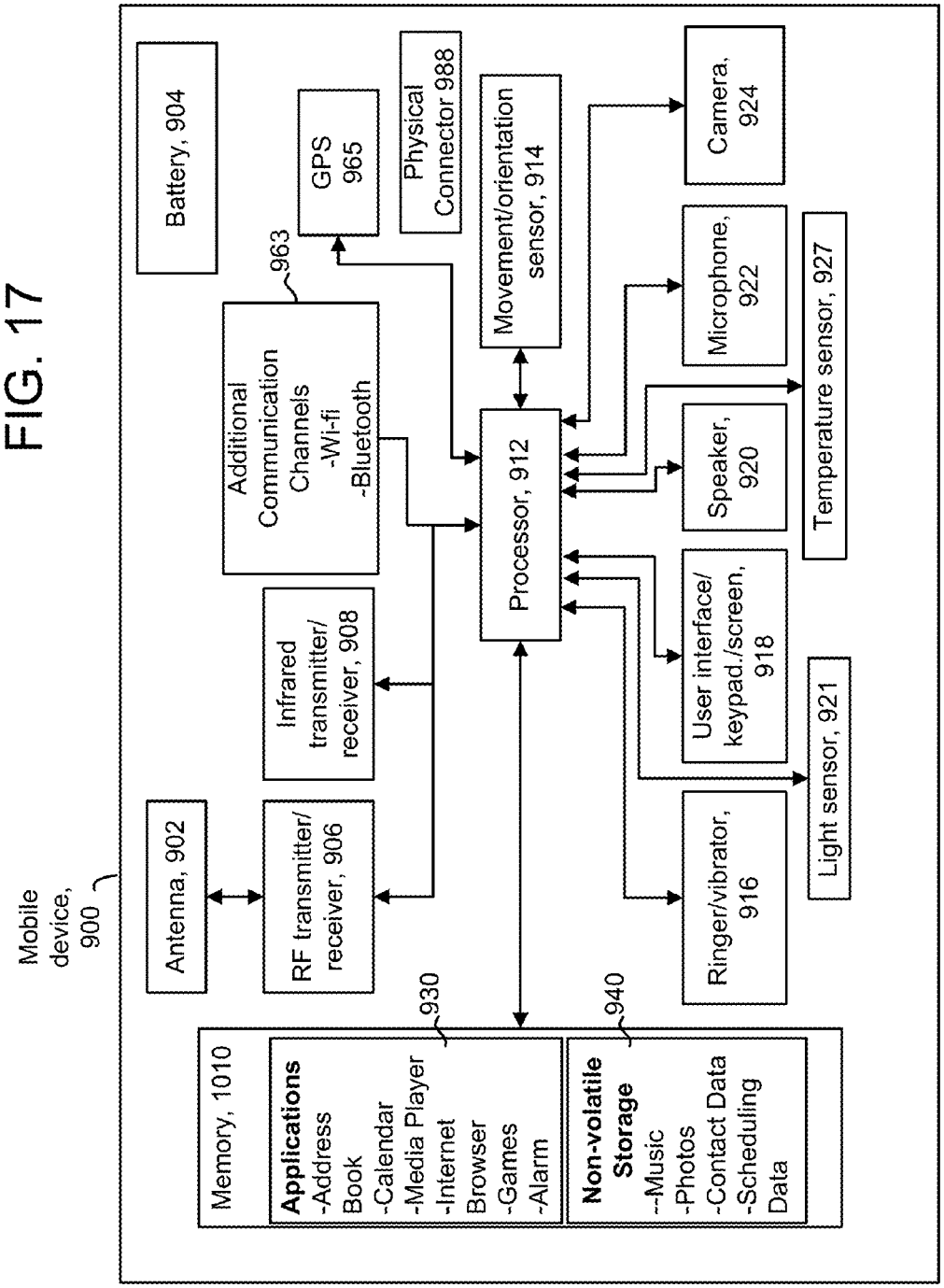

MAKING STATIC PRINTED CONTENT DYNAMIC WITH VIRTUAL DATA

BACKGROUND

Static printed material may be thought of as a form of read only memory which requires no power and stores its data in a form visible to the human eye. Vellum texts over a thousand years old survive to this day. Additionally, the data is presented generally in a format comfortable for human eye reading which presents printed text against a contrasting physical background of white or another contrasting colored paper. The physical nature of the printed material allows a user to physically sift through its data for "something of interest," for example, by flipping through its pages and looking at illustrations or catchy titles in a magazine. One can hold one's place in a physical book, and flip back a clump of pages, which the user's brain knows is about the right section, to reread a section and look back at the place held by a finger too. Of course, physical books, periodicals and paper have their disadvantages too due to the permanent setting of information on their pages.

SUMMARY

Mixed reality is a technology that allows virtual imagery to be mixed with a real world view. A see-through, head mounted, mixed reality display device may be worn by a user to view the mixed imagery of real objects and virtual objects displayed in the user's field of view. Such a head mounted display (HMD) device can update, and in some instances, restore the data embodied in the static printed material. In other words, the physical book, magazine or other embodiment of static printed material becomes a form of memory which is dynamic in the sense that what appears on a printed sheet of paper, a printed card or other printed medium can change.

The technology provides an embodiment of a method for making static printed content dynamic with virtual data using a see-through, near eye, mixed reality display device. The method comprises identifying a printed content item in a field of view of a see-through, near eye, mixed reality display device and identifying user selection of a printed content selection within the printed content item based on physical action user input. A task a user is requesting is determined for the printed content selection based on physical action user input and is performed. Virtual data related to the printed content selection is displayed in accordance with the requested task.

The technology provides an embodiment of a system for a see-through, near-eye, mixed reality display device system for making static printed material dynamic. The system comprises a respective see-through display for each eye positioned by a support structure. An example of a support structure is a frame. At least one outward facing camera is positioned on the support structure for capturing image data in a field of view of the respective see-through displays. One or more software controlled processors are communicatively coupled to the at least one outward facing camera for receiving image data and to at least one image generation unit optically coupled to the respective see-through displays.

The one or more software controlled processors identify user selection of a printed content selection based on physical action user input and image data. For example a page of a book may be in view of the at least one outward facing camera. A physical action user input is an action performed by a user using a body part and captured by a natural user interface (NUI). The physical action provides data or commands which direct the operation of an application. Some examples of physical actions are eye gaze and a gesture.

The one or more software controlled processors are communicatively coupled to a search engine having access to datastores including content, layout and virtual data for works and printed content items embodying the works. The one or more software controlled processors identify a printed content item including the printed content selection and a work including a medium independent version of the printed content selection based on formulating one or more queries based on the image data. The one or more queries are sent to the search engine.

The one or more software controlled processors cause the at least one communicatively coupled image generation unit to display virtual data associated with the printed content selection or the medium independent version of the printed content selection by each optically coupled respective see-through display.

The technology provides an embodiment of one or more processor readable storage devices having instructions encoded thereon which instructions cause one or more processors to execute a method for improving readability of static printed material with virtual data using a see-through, near eye, mixed reality display device system. The method comprises identifying printed material in a field of view of the see-through, near eye, mixed reality display device system based on image data captured by one or more outward facing cameras of the display device system and determining whether readability criteria is satisfied for the printed material positioned in the field of view. Responsive to readability criteria not being satisfied, a virtual version of the printed material is displayed in the field of view which satisfies readability criteria. Additionally, action is taken responsive to physical action user input with respect to either or both of the virtual version of the printed material or the printed material if the printed material is still within a field of view of the one or more outward facing cameras.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1A is a block diagram depicting example components of one embodiment of a see-through, mixed reality display device system.

FIG. 1B is a block diagram depicting example components of another embodiment of a see-through, mixed reality display device system.

FIG. 2A is a side view of an eyeglass temple of a frame in an embodiment of the see-through, mixed reality display device embodied as eyeglasses providing support for hardware and software components.

FIG. 2B is a top view of an embodiment of a display optical system of a see-through, near-eye, mixed reality device.

FIG. 5 is a flowchart of an embodiment of a method for making static printed content dynamic with virtual data.

FIG. 6 is a flowchart of an embodiment of a process for identifying a printed content item in a field of view of a see-through, mixed reality display device.

FIG. 9B is a flowchart of an embodiment of a method of performing a search based on at least one keyword associated with a printed content selection.

FIG. 9C is a flowchart of an embodiment of a method of performing a search based on at least one keyword associated with a marker for a printed content selection within a subdivision including other markers.

FIG. 17 is a block diagram of an exemplary mobile device which may operate in embodiments of the technology.

DETAILED DESCRIPTION

Figure 1C:
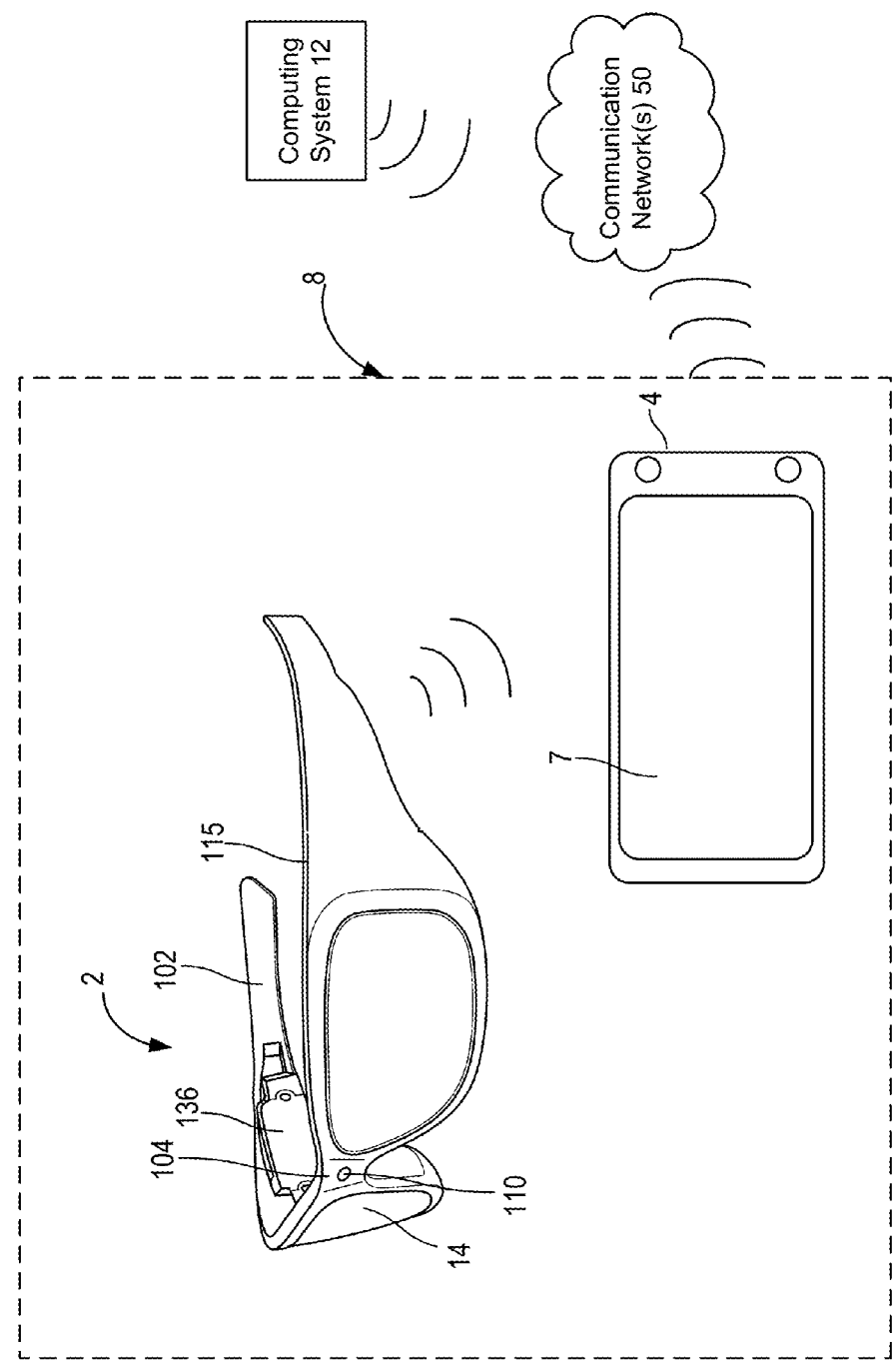
FIG. 1C is a block diagram depicting example components of another embodiment of a see-through, mixed reality display device system using a mobile device as a processing unit.

The technology provides various embodiments for making static printed content dynamic with virtual data seen through and displayed by a see-through, near-eye, mixed reality display device system. The see-through display device system identifies a real book, magazine, newspaper or other real printed material in a user field of view. A book, magazine, newspaper, a card or a separate sheet of paper are all examples of a printed content item which object recognition software can identify from image data captured by front facing cameras positioned on the display device system to capture objects in the field of view of the display device which approximates the user field of view when looking through the display device.

In some instances, eye gaze data identifies where a user is focusing in the field of view, and can thus identify at which portion of the printed content item a user is looking. A gaze duration on a portion of the printed material can identify the portion as a printed content selection. Gaze duration is an example of a physical action of a user using a body part. A gesture performed by a user body part such as a hand or finger and captured in image data is also an example of physical action user input. A blink or blinking sequence of an eye can also be a gesture. A pointing or particular movement gesture by a hand, finger or other body part can also indicate a printed content selection like a word, sentence, paragraph or photograph. A user generated sound command such as a voice command may also be considered an example of a physical action indicating user input. Sound based actions typically accompany other physical actions like a gesture and eye gaze.

Once the user selects a picture or text, different tasks or applications can be executed with respect to the content selection like augmentation with interactive games and holograms, replacement with updated content, and annotation using virtual data, either three dimensional, two dimensional or both. Readability can also be improved by generating and displaying a virtual version of at least a part of the printed content item.

FIG. 1A is a block diagram depicting example components of an embodiment of a see-through, augmented or mixed reality display device system. System 8 includes a see-through display device as a near-eye, head mounted display device 2 in communication with a processing unit 4 via a wire 6 in this example or wirelessly in other examples. In this embodiment, head mounted, display device 2 is in the shape of eyeglasses in a frame 115, with a display optical system 14 for each eye in which image data is projected into a user's eye to generate a display of the image data while a user also sees through the display optical systems 14 for an actual direct view of the real world.

The use of the term "actual direct view" refers to the ability to see real world objects directly with the human eye, rather than seeing created image representations of the objects. For example, looking through glass at a room allows a user to have an actual direct view of the room, while viewing a video of a room on a television is not an actual direct view of the room. Each display optical system 14 is also referred to as a see-through display, and the two display optical systems 14 together may also be referred to as a see-through display.

Frame 115 provides a support structure for holding elements of the system in place as well as a conduit for electrical connections. In this embodiment, frame 115 provides a convenient eyeglass frame as support for the elements of the system discussed further below. The frame 115 includes a nose bridge portion 104 with a microphone 110 for recording sounds and transmitting audio in this embodiment. A temple or side arm 102 of the frame rests on each of a user's ears. In this example, the right temple 102r includes control circuitry 136 for the display device 2.

As illustrated in FIGS. 2A and 2B, an image generation unit 120 is included on each temple 102 in this embodiment as well. Also, not shown in this view, but illustrated in FIGS. 2A and 2B are outward facing cameras 113 for recording digital images and videos and transmitting the visual recordings to the control circuitry 136 which may in turn send the captured image data to the processing unit 4 which may also send the data to one or more computer systems 12 over a network 50.

The processing unit 4 may take various embodiments. In some embodiments, processing unit 4 is a separate unit which may be worn on the user's body, e.g. a wrist, or be a separate device like the illustrated mobile device 4 as illustrated in FIG. 1C. The processing unit 4 may communicate wired or wirelessly (e.g., WiFi, Bluetooth, infrared, RFID transmission, wireless Universal Serial Bus (WUSB), cellular, 3G, 4G or other wireless communication means) over a communication network 50 to one or more computing systems 12 whether located nearby or at a remote location. In other embodiments, the functionality of the processing unit 4 may be integrated in software and hardware components of the display device 2 as in FIG. 1B.

Figure 16:
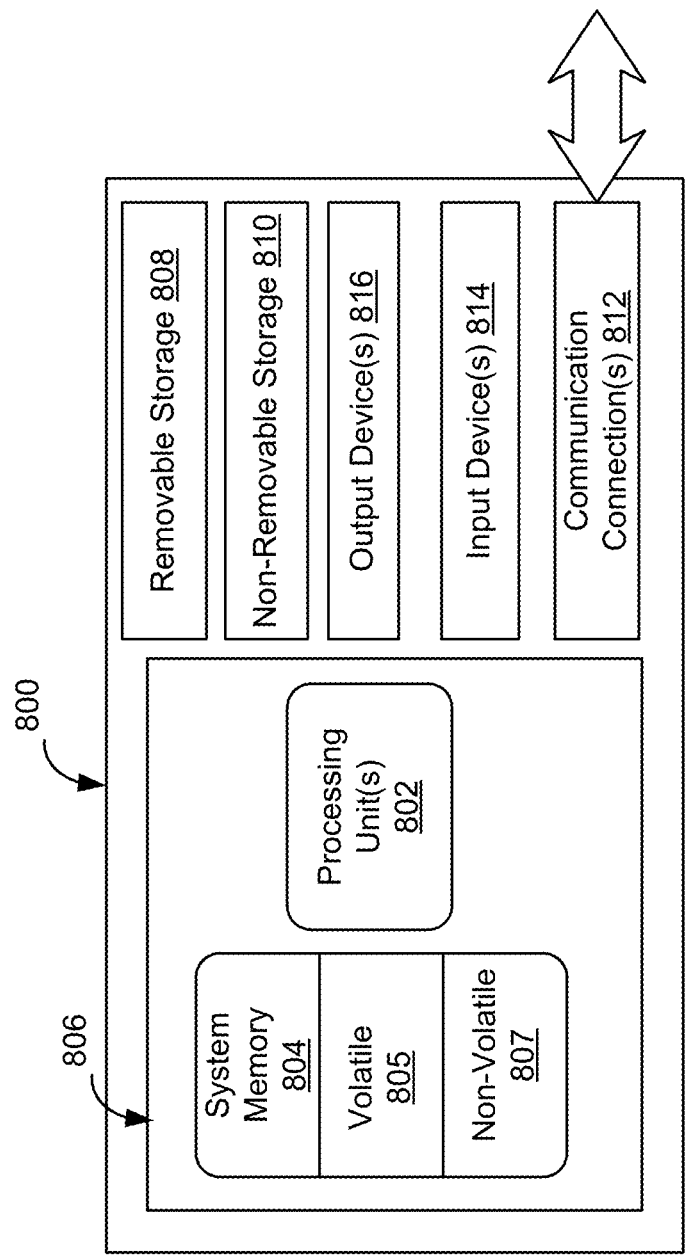
FIG. 16 is a block diagram of one embodiment of a computing system that can be used to implement a network accessible computing system.

A remote, network accessible computer system 12 may be leveraged for processing power and remote data access. An application may be executing on computing system 12 which interacts with or performs processing for display system 8, or may be executing on one or more processors in the see-through, mixed reality display system 8. An example of hardware components of a computing system 12 is shown in FIG. 16.

FIG. 1B is a block diagram depicting example components of another embodiment of a see-through, augmented or mixed reality display device system 8 which may communicate over a communication network 50 with other devices. In this embodiment, the control circuitry 136 of the display device 2 communicates wirelessly via a wireless transceiver (see 137 in FIG. 2A) over a communication network 50 to one or more computer systems 12.

FIG. 1C is a block diagram of another embodiment of a see-through, mixed reality display device system using a mobile device as a processing unit 4. Examples of hardware and software components of a mobile device 4 such as may be embodied in a smartphone or tablet computing device are described in FIG. 17. A display 7 of the mobile device 4 may also display data, for example menus, for executing applications and be touch sensitive for accepting user input. Some other examples of mobile devices 4 are a smartphone, a laptop or notebook computer, and a netbook computer.

FIG. 2A is a side view of an eyeglass temple 102 of the frame 115 in an embodiment of the see-through, mixed reality display device 2 embodied as eyeglasses providing support for hardware and software components. At the front of frame 115 is physical environment facing video camera 113 that can capture video and still images of the real world to map real objects in the field of view of the see-through display, and hence, in the field of view of the user. The cameras are also referred to as outward facing cameras meaning facing outward from the user's head. Each front facing camera 113 is calibrated with respect to a reference point of its respective display optical system 14 such that the field of view of the display optical system 14 can be determined from the image data captured by the respective camera 113. One example of such a reference point is an optical axis (see 142 in FIG. 2B) of its respective display optical system 14. The image data is typically color image data.

In many embodiments, the two cameras 113 provide overlapping image data from which depth information for objects in the scene may be determined based on stereopsis. In some examples, the cameras may also be depth sensitive cameras which transmit and detect infrared light from which depth data may be determined The processing identifies and maps the user's real world field of view. Some examples of depth sensing technologies that may be included on the head mounted display device 2 without limitation, are SONAR, LIDAR, Structured Light, and/or Time of Flight.

Control circuits 136 provide various electronics that support the other components of head mounted display device 2. In this example, the right temple 102r includes control circuitry 136 for the display device 2 which includes a processing unit 210, a memory 244 accessible to the processing unit 210 for storing processor readable instructions and data, a wireless interface 137 communicatively coupled to the processing unit 210, and a power supply 239 providing power for the components of the control circuitry 136 and the other components of the display 2 like the cameras 113, the microphone 110 and the sensor units discussed below. The processing unit 210 may comprise one or more processors including a central processing unit (CPU) and a graphics processing unit (GPU).

Inside, or mounted to temple 102, are ear phones 130, inertial sensors 132, one or more location or proximity sensors 144, some examples of which are a GPS transceiver, an infrared (IR) transceiver, or a radio frequency transceiver for processing RFID data. Optional electrical impulse sensor 128 detects commands via eye movements. In one embodiment, inertial sensors 132 include a three axis magnetometer 132A, three axis gyro 132B and three axis accelerometer 132C. The inertial sensors are for sensing position, orientation, and sudden accelerations of head mounted display device 2. From these movements, head position may also be determined In this embodiment, each of the devices using an analog signal in its operation like the sensor devices 144, 128, 130, and 132 as well as the microphone 110 and an IR illuminator 134A discussed below, include control circuitry which interfaces with the digital processing unit 210 and memory 244 and which produces and converts analog signals for its respective device.

Mounted to or inside temple 102 is an image source or image generation unit 120 which produces visible light representing images. In one embodiment, the image source includes micro display 120 for projecting images of one or more virtual objects and coupling optics lens system 122 for directing images from micro display 120 to reflecting surface or element 124. The microdisplay 120 may be implemented in various technologies including transmissive projection technology, micro organic light emitting diode (OLED) technology, or a reflective technology like digital light processing (DLP), liquid crystal on silicon (LCOS) and Mirasol® display technology from Qualcomm, Inc. The reflecting surface 124 directs the light from the micro display 120 into a lightguide optical element 112, which directs the light representing the image into the user's eye. Image data of a virtual object may be registered to a real object meaning the virtual object tracks its position to a position of the real object seen through the see-through display device 2 when the real object is in the field of view of the see-through displays 14.

In some embodiments, one or more printed content selections being tracked for augmentation may be printed with one or more markers to improve detection of a content selection.

Markers may also include metadata describing the content selection. For example, a photograph in a magazine may be printed with IR retroreflective markers or RFID tags which include the identifiers for the people in the photograph, as well as the place, date and time of day at which it was taken. Additionally, an identifier of one or more printed or electronic versions of a work in which it has been printed may be included. An IR or RFID unit 144 may detect the marker and send the data it contains to the control circuitry 136.

FIG. 2B is a top view of an embodiment of one side of a see-through, near-eye, mixed reality display device including a display optical system 14. A portion of the frame 115 of the near-eye display device 2 will surround a display optical system 14 for providing support and making electrical connections. In order to show the components of the display optical system 14, in this case 14r for the right eye system, in the head mounted display device 2, a portion of the frame 115 surrounding the display optical system is not depicted.

In the illustrated embodiment, the display optical system 14 is an integrated eye tracking and display system. The system includes a light guide optical element 112, opacity filter 114, and optional see-through lens 116 and see-through lens 118. The opacity filter 114 for enhancing contrast of virtual imagery is behind and aligned with optional see-through lens 116, lightguide optical element 112 for projecting image data from the microdisplay 120 is behind and aligned with opacity filter 114, and optional see-through lens 118 is behind and aligned with lightguide optical element 112. More details of the light guide optical element 112 and opacity filter 114 are provided below.

Light guide optical element 112 transmits light from micro display 120 to the eye 140 of the user wearing head mounted, display device 2. Light guide optical element 112 also allows light from in front of the head mounted, display device 2 to be transmitted through light guide optical element 112 to eye 140, as depicted by arrow 142 representing an optical axis of the display optical system 14r, thereby allowing the user to have an actual direct view of the space in front of head mounted, display device 2 in addition to receiving a virtual image from micro display 120. Thus, the walls of light guide optical element 112 are see-through. Light guide optical element 112 includes a first reflecting surface 124 (e.g., a mirror or other surface). Light from micro display 120 passes through lens 122 and becomes incident on reflecting surface 124. The reflecting surface 124 reflects the incident light from the micro display 120 such that light is trapped inside a waveguide, a planar waveguide in this embodiment. A representative reflecting element 126 represents the one or more optical elements like mirrors, gratings, and other optical elements which direct visible light representing an image from the planar waveguide towards the user eye 140.

Infrared illumination and reflections, also traverse the planar waveguide 112 for an eye tracking system 134 for tracking the position of the user's eyes. The position of the user's eyes and image data of the eye in general may be used for applications such as gaze detection, blink command detection and gathering biometric information indicating a personal state of being for the user. The eye tracking system 134 comprises an eye tracking illumination source 134A and an eye tracking IR sensor 134B positioned between lens 118 and temple 102 in this example. In one embodiment, the eye tracking illumination source 134A may include one or more infrared (IR) emitters such as an infrared light emitting diode (LED) or a laser (e.g. VCSEL) emitting about a predetermined IR wavelength or a range of wavelengths. In some embodiments, the eye tracking sensor 134B may be an IR camera or an IR position sensitive detector (PSD) for tracking glint positions.

The use of a planar waveguide as a light guide optical element 112 in this embodiment allows flexibility in the placement of entry and exit optical couplings to and from the waveguide's optical path for the image generation unit 120, the illumination source 134A and the IR sensor 134B. In this embodiment, a wavelength selective filter 123 passes through visible spectrum light from the reflecting surface 124 and directs the infrared wavelength illumination from the eye tracking illumination source 134A into the planar waveguide 112 through wavelength selective filter 125 passes through the visible illumination from the micro display 120 and the IR illumination from source 134A in the optical path heading in the direction of the nose bridge 104. Reflective element 126 in this example is also representative of one or more optical elements which implement bidirectional infrared filtering which directs IR illumination towards the eye 140, preferably centered about the optical axis 142 and receives IR reflections from the user eye 140. Besides gratings and such mentioned above, one or more hot mirrors may be used to implement the infrared filtering. In this example, the IR sensor 134B is also optically coupled to the wavelength selective filter 125 which directs only infrared radiation from the waveguide including infrared reflections of the user eye 140, preferably including reflections captured about the optical axis 142, out of the waveguide 112 to the IR sensor 134B.

In other embodiments, the eye tracking unit optics are not integrated with the display optics. For more examples of eye tracking systems for HMD devices, see U.S. Pat. No. 7,401,920, entitled "Head Mounted Eye Tracking and Display System", issued Jul. 22, 2008 to Kranz et al., see U.S. patent application Ser. No. 13/221,739, Lewis et al., entitled "Gaze Detection in a See-Through, Near-Eye, Mixed Reality Display," filed Aug. 30, 2011, and see U.S. patent application Ser. No. 13/245,700, Bohn, entitled "Integrated Eye Tracking and Display System," filed Sep. 26, 2011, all of which are incorporated herein by reference.

Another embodiment for tracking the direction of the eyes is based on charge tracking. This concept is based on the observation that a retina carries a measurable positive charge and the cornea has a negative charge. Sensors 128, in some embodiments, are mounted by the user's ears (near earphones 130) to detect the electrical potential while the eyes move around and effectively read out what the eyes are doing in real time. (See *Control your mobile music with eyeball-activated earphones*!, Feb. 19, 2010, http://www.wirefresh.com/control-your-mobile-music-with-eyeball-actvated-headphones, which is hereby incorporated by reference.) Eye blinks may be tracked as commands Other embodiments for tracking eyes movements such as blinks which are based on pattern and motion recognition in image data from the small eye tracking camera 134B mounted on the inside of the glasses, can also be used. The eye tracking camera 134B sends buffers of image data to the memory 244 under control of the control circuitry 136.

Opacity filter 114, which is aligned with light guide optical element 112, selectively blocks natural light from passing through light guide optical element 112 for enhancing contrast of virtual imagery. When the system renders a scene for the mixed reality display, it takes note of which real-world objects are in front of which virtual objects and vice versa. If a virtual object is in front of a real-world object, then the opacity is turned on for the coverage area of the virtual object. If the virtual object is (virtually) behind a real-world object, then the opacity is turned off, as well as any color for that display area, so the user will only see the real-world object for that corresponding area of real light. The opacity filter assists the image of a virtual object to appear more realistic and represent a full range of colors and intensities. In this embodiment, electrical control circuitry for the opacity filter, not shown, receives instructions from the control circuitry 136 via electrical connections routed through the frame.

Again, FIGS. 2A and 2B only show half of the head mounted display device 2. A full head mounted display device would include another set of optional see-through lenses 116 and 118, another opacity filter 114, another light guide optical element 112, another micro display 120, another lens system 122 physical environment facing camera 113 (also referred to as outward facing or front facing camera 113), eye tracking assembly 134, earphones 130, and sensors 128 if present. Additional details of a head mounted display 2 are illustrated in U.S. patent application Ser. No. 12/905,952 entitled Fusing Virtual Content Into Real Content, Filed Oct. 15, 2010, fully incorporated herein by reference.

Figure 3:
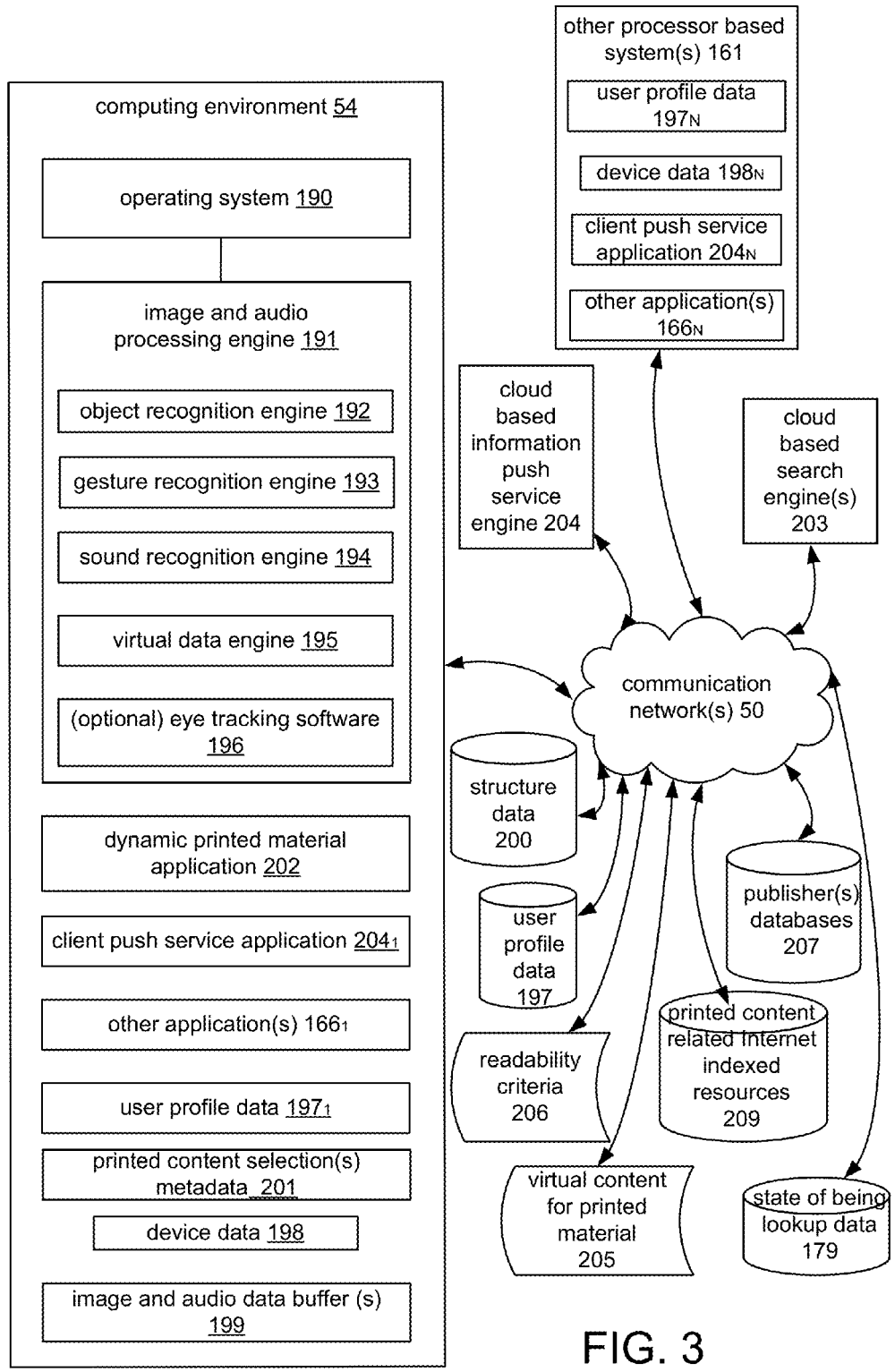
FIG. 3 is a block diagram of a system from a software perspective for providing a mixed reality user interface by a see-through, mixed reality display device system in which software for making printed material dynamic can operate.

FIG. 3 illustrates a computing environment embodiment from a software perspective which may be implemented by the display device system 8, a remote computing system 12 in communication with the display device system or both. Network connectivity allows leveraging of available computing resources. The computing environment 54 may be implemented using one or more computer systems. As shown in the embodiment of FIG. 3, the software components of a computing environment 54 include an image and audio processing engine 191 in communication with an operating system 190. Image and audio processing engine 191 includes object recognition engine 192, gesture recognition engine 193, sound recognition engine 194, virtual data engine 195, and, optionally eye tracking software 196 if eye tracking is in use, all in communication with each other. Image and audio processing engine 191 processes video, image, and audio data received from a capture device such as the outward facing cameras 113. To assist in the detection and/or tracking of objects, an object recognition engine 192 of the image and audio processing engine 191 may access one or more databases of structure data 200 over one or more communication networks 50.

Virtual data engine 195 processes virtual objects and registers the position and orientation of virtual objects in relation to one or more coordinate systems. Additionally, the virtual data engine 195 performs the translation, rotation, scaling and perspective operations using standard image processing methods to make the virtual object appear realistic. A virtual object position may be registered or dependent on a position of a corresponding real object. The virtual data engine 195 determines the position of image data of a virtual object in display coordinates for each display optical system 14. The virtual data engine 195 may also determine the position of virtual objects in various maps of a real-world environment stored in a memory unit of the display device system 8 or of the computing system 12. One map may be the field of view of the display device with respect to one or more reference points for approximating the locations of the user's eyes. For example, the optical axes of the see-through display optical systems 14 may be used as such reference points. In other examples, the real-world environment map may be independent of the display device, e.g. a 3D map or model of a location (e.g. store, coffee shop, museum).

One or more processors of the computing system 12, or the display device system 8 or both also execute the object recognition engine 192 to identify real objects in image data captured by the environment facing cameras 113. As in other image processing applications, a person can be a type of object. For example, the object recognition engine 192 may implement pattern recognition based on structure data 200 to detect particular objects including a human. The object recognition engine 192 may also include facial recognition software which is used to detect the face of a particular person.

Structure data 200 may include structural information about targets and/or objects to be tracked. For example, a skeletal model of a human may be stored to help recognize body parts. In another example, structure data 200 may include structural information regarding one or more inanimate objects in order to help recognize the one or more inanimate objects. The structure data 200 may store structural information as image data or use image data as references for pattern recognition. The image data may also be used for facial recognition. As printed material typically includes text, the structure data 200 may include one or more image datastores including images of numbers, symbols (e.g. mathematical symbols), letters and characters from alphabets used by different languages. Additionally, structure data 200 may include handwriting samples of the user for identification. Based on the image data, the dynamic printed material application 202 can convert the image data to a computer standardized data format for text with a smaller memory footprint. Some examples of computer standardized text data formats are Unicode based on the Universal Character Set (UCS) and the American Standard Code for Information Interchange (ASCII) format. The text data can then be searched against databases for identification of the content including the text or for related information about the content of the text.

Upon detection of one or more objects by the object recognition engine 192, image and audio processing engine 191 may report to operating system 190 an identification of each object detected and a corresponding position and/or orientation which the operating system 190 passes along to an application like dynamic printed material application 202.

The sound recognition engine 194 processes audio received via microphone 110.

The outward facing cameras 113 in conjunction with the gesture recognition engine 193 implements a natural user interface (NUI) in embodiments of the display device system 8. Blink commands or gaze duration data identified by the eye tracking software 196 are also examples of physical action user input. Voice commands may also supplement other recognized physical actions such as gestures and eye gaze.

The gesture recognition engine 193 can identify actions performed by a user indicating a control or command to an executing application. The action may be performed by a body part of a user, e.g. a hand or finger typically in reading applications, but also an eye blink sequence of an eye can be gestures. In one embodiment, the gesture recognition engine 193 includes a collection of gesture filters, each comprising information concerning a gesture that may be performed by at least a part of a skeletal model. The gesture recognition engine 193 compares a skeletal model and movements associated with it derived from the captured image data to the gesture filters in a gesture library to identify when a user (as represented by the skeletal model) has performed one or more gestures. In some examples, a camera, in particular a depth camera in the real environment separate from the display device 2 in communication with the display device system 8 or a computing system 12 may detect the gesture and forward a notification to the system 8, 12. In other examples, the gesture may be performed in view of the cameras 113 by a body part such as the user's hand or one or more fingers.

In some examples, matching of image data to image models of a user's hand or finger during gesture training sessions may be used rather than skeletal tracking for recognizing gestures.

More information about the detection and tracking of objects can be found in U.S. patent application Ser. No. 12/641,788, "Motion Detection Using Depth Images," filed on Dec. 18, 2009; and U.S. patent application Ser. No. 12/475,308, "Device for Identifying and Tracking Multiple Humans over Time," both of which are incorporated herein by reference in their entirety. More information about the gesture recognition engine 193 can be found in U.S. patent application Ser. No. 12/422,661, "Gesture Recognizer System Architecture," filed on Apr. 13, 2009, incorporated herein by reference in its entirety. More information about recognizing gestures can be found in U.S. patent application Ser. No. 12/391,150, "Standard Gestures," filed on Feb. 23, 2009; and U.S. patent application Ser. No. 12/474,655, "Gesture Tool," filed on May 29, 2009, both of which are incorporated by reference herein in their entirety.

The computing environment 54 also stores data in image and audio data buffer(s) 199. The buffers provide memory for receiving image data captured from the outward facing cameras 113, image data from an eye tracking camera of an eye tracking assembly 134 if used, buffers for holding image data of virtual objects to be displayed by the image generation units 120, and buffers for audio data such as voice commands from the user via microphone 110 and instructions to be sent to the user via earphones 130.

Device data 198 may include a unique identifier for the computer system 8, a network address, e.g. an IP address, model number, configuration parameters such as devices installed, identification of the operation system, and what applications are available in the display device system 8 and are executing in the display system 8 etc. Particularly for the see-through, mixed reality display device system 8, the device data may also include data from sensors or determined from the sensors like the orientation sensors 132, the temperature sensor 138, the microphone 110, the electrical impulse sensor 128 if present, and the location and proximity transceivers 144.

In this embodiment, the display device system 8 and other processor based systems 161 used by the user execute a client side version of a push service application $204_N$ which communicates over a communication network 50 with an information push service engine 204. The information push service engine 204 is cloud based in this embodiment. A cloud based engine is one or more software applications which execute on and store data by one or more networked computer systems. The engine is not tied to a particular location. Some examples of cloud based software are social networking sites and web-based email sites like Yahoo!® and Hotmail®. A user may register an account with the information push service engine 204 which grants the information push service permission to monitor the user's executing applications and data generated and received by them as well as user profile data 197, and device data 198 for tracking the user's location and device capabilities. Based on the user profile data aggregated from the user's systems 8, 161, the data received and sent by the executing applications on systems 8, 161 used by the user, and location and other sensor data stored in device data $198_1$, $198_N$, the information push service 204 can determine a physical context, a social context, a personal context or a combination of contexts for the user.

The local copies of the user profile data $197_1$, $197_N$ may store some of the same user profile data 197 and may periodically update their local copies with the user profile data stored by the computer system 12 in an accessible database 197 over a communication network 50. Some examples of user profile data 197 are the user's expressed preferences, the user's friends' list, the user's preferred activities, the user's favorites, some examples of which are, favorite color, favorite foods, favorite books, favorite author, etc., a list of the user's reminders, the user's social groups, the user's current location, and other user created content, such as the user's photos, images and recorded videos. In one embodiment, the user-specific information may be obtained from one or more data sources or applications such as the information push service 204, a user's social networking sites, contacts or address book, schedule data from a calendar application, email data, instant messaging data, user profiles or other sources on the Internet as well as data directly entered by the user. As discussed below, a state of being may be derived from eye data and be updated and stored in the user profile data 197 both locally and by the remote push service application 204. In this embodiment, a network accessible state of being lookup table 179 links identified eye data with a state of being as a reference for deriving the state of being.

Trust levels may be determined by user profile data 197 which identifies people known to the user, for example as social networking friends and family members sharing the same gaming service, which may be subdivided into different groups based on trust levels. Additionally, the user may explicitly identify trust levels in their user profile data 197 using a client side push service application $204_N$. In one embodiment, the cloud based information push service engine 204 aggregates data from user profile data $197_N$ stored on the different user computer systems 8, 161 of the user.

Each version of the push service application 204 also stores in user profile data 197 a tracking history of the user. Some examples of events, people and things tracked in the tracking history are locations visited, transactions, content and real things purchased, and people detected with whom the user has interacted. If electronically identified friends (e.g. social networking friends) are registered with the push service application 204 too, or they make information available to the user or publicly through other applications 166, the push service application 204 can use this data as well to track the content and social context of the user.

Figure 4A:
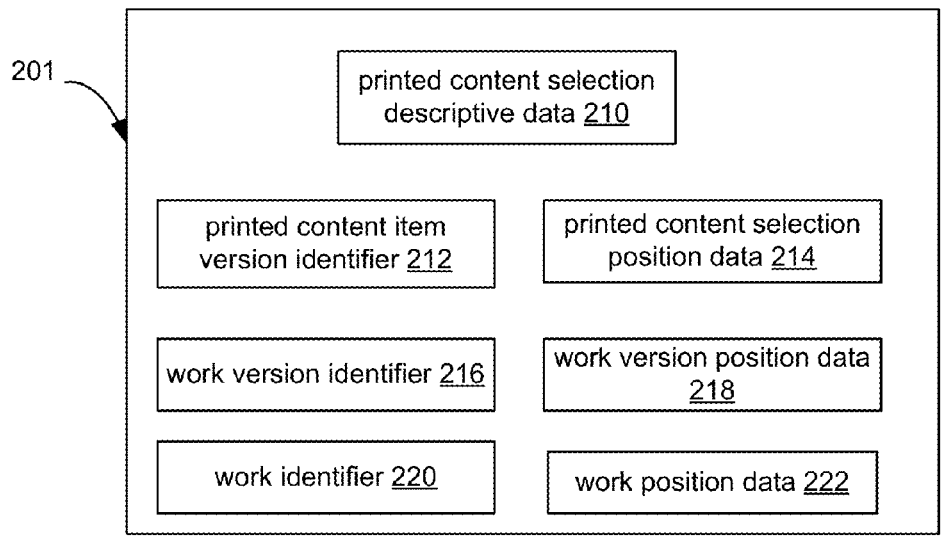
FIG. 4A illustrates an example of a printed content selection metadata record.

As discussed further below, the dynamic printed material application 202 may access one or more search engines 203 for accessing information for identifying a printed content selection and a printed content item including it as well as related virtual data 205. Examples of resources which may be searched for identification and pertinent virtual data are illustrated as publisher databases 207 and printed content related resources 209 indexed for Internet searching. For example, a general purpose search engine like Bing® or Google® may be accessed as well as a search engine for the Library of Congress, university libraries or publisher databases made available to the public or on a subscription basis as may be identified in user profile data. Publishers may have pointers to virtual content in their databases 207 as publishers may have a business model for encouraging virtual content to be developed for their print material. Additionally, entities not associated with the publishers or who wish to maintain their own data resources may wish to make virtual content available through their own websites which are Internet indexed resources. From searching on information derived from image data of the printed content selection and the printed content item containing it, data fields in metadata 201 for a printed content selection can be filled with values. FIG. 4A discussed below provides an example of a printed content selection metadata record.

One advantage of the technology is the ability to update previously published material which was printed without any plan for virtual augmentation. As discussed below, a user may be requested to view printed version identifying data on the printed content, for example a title page of a book or newspaper or a table of contents of a magazine. Other examples of version identifying data are standardized identifiers, an example of which is the International Standard Book Number (ISBN) for books. The ISBN number on the book identifies data such as a language group, publisher, title and edition or variation of the book. For periodicals, the International Standard Serial Number (ISSN) identifies the title of a periodical and a Serial Item and Contribution Identifier (SICI) is a standard used to identify specific volumes, articles or other identifiable parts of the periodical. For example, the ISSN may identify a periodical, for example the Journal of Head Mounted Displays and a SICI identifies an article by bibliographic items, some examples of which are title, volume and number, date of publication, beginning and ending pages and content format, e.g. TX for printed text. Other content formats may indicate web publication and audiovisual formats. The image data from the outward facing cameras or text converted from image data of the viewed identifying data is sent to one or more search engines 203.

Discussed below are methods for improving readability of printed material by creating a virtual version of the printed material to satisfy readability criteria 206 which may be stored as rules for execution of a rule engine of the dynamic printed material application 202. Some examples of readability criteria are comfortable reading position criteria and visibility criteria. Some examples of comfortable reading position criteria are an angular position criteria from a respective reference point of a see through display for each eye included in the see-through, mixed reality display device system, a depth distance from the see through display for each eye, and an orientation of content data in the field of view of the display device. An example of a reference point is an optical axis 142 of the display typically located about the center of the display and which approximates an alignment with the user's pupil when the user is looking straight ahead at an object. If printed material is too off to one side, that can result in neck strain. Depth distance criteria can indicate reading material is too close or too far away. Orientation of content data can indicate the text or pictures are upside down or off to one side which is not ideal for viewing. Examples of visibility criteria can be the size of the text or pictorial content in the field of view. If too small or too large, the size of the content can be adjusted to a comfortable level.

The criteria may be based on the user's actual eyesight if a prescription has been uploaded, eyesight typical for a user's age or based on average eyesight characteristics for humans.

Once the printed version of the work the user is looking at is identified and the printed content selection is located within it, the dynamic printed material application 202 can query one or more search engines 203 to search for virtual content 205 for the printed content selection based on the printed content item including it. In some embodiments, the virtual content is associated with a work or a work version including the content selection independent of the medium expressing the content. For example, paper or other printable material is an example of a medium. Another medium expressing a work is an electronic display or audio recording.

In some instances, the virtual data 205 is data specifically generated for appearing in relation to the content selection as laid out in a specific printed version, for example on a particular page of a book or other subdivision of printed material. For example, a publisher may create virtual content for updating a recent version of a textbook with an explanation to be displayed over a page with out-of-date information indicating that there are nine (9) planets and listing the planets. The up-to-date explanation may be an image specifically formatted to overlay the entire page and explains that there are now only eight (8) planets rather than nine (9) and why Pluto does not qualify as a planet. In another example, a publisher, who has the layout of a book stored in its databases can supply interactive games and other content for a book at predetermined positions on a page and for specific pages.

In other examples, virtual content 205 is tied to a medium independent work or work version. For example, a professor may store her notes she has made at different points in her printed copy of a textbook to be available for any version of the textbook independent of medium. In other words, the content of the textbook is a work. Current, previous and future versions of the textbook are versions of the work. The dynamic printed material application 202 links each note to a subdivision of the work in a medium independent organization of the work. For example, a note may be linked to a phrase in a particular paragraph which can be identified by executing software instructions for text matching. A paragraph is a medium independent subdivision while a page is dependent on the particular printing or electronic layout. A paperback copy of a textbook with smaller print is a different printed work version from a hardback copy of the textbook in larger print although they contain the exact same version of the textbook content. The professor may allow her virtual notes to be available for storage or streaming, at her discretion, to students who take her class or past students by granting permission and access to them.

FIG. 4A illustrates an example of a printed content selection metadata record which includes printed content selection descriptive data 210, a printed content item version identifier 212, printed content selection position data 214, a work version identifier 216 and work version position data 218 if applicable, a work identifier 220 and work position data 222. The work identifier 220 identifies the creative work independent of a particular format or medium. The work position data 222 identifies one or more locations of the printed content selection in terms of one or more medium independent subdivisions like paragraphs, stanzas, verses, etc. A work version identifier 216 may be included to describe different versions or editions of the work 210, for example translations, also independent of a particular format or medium. The work version position 218 may also be defined in terms of one or more medium independent subdivisions. The printed content item version identifier 212 identifies a particular printed edition of a particular printed layout. The printed version identifier 212 is tied to the medium of paper or other material which is physically printed. The printed content selection position data 214 may be in terms of a specific static printed layout location like a page or a position on a page.

For example, the poem "Beowulf" is a work. The original old English form of the poem is a work version, as would be a version which has substituted modern English terms for some of the words. Another example of a version would be a French translation. Another example would be the original old English poem footnoted with comments. A printed version identifier 212 may identify a printed version of the poem on one or more sheets of vellum maintained in a library. This printed version would also have the work version identifier for the original old English form and the work identifier for Beowulf associated with it. A different printed content item version identifier 212 identifies an anthology of English literature which has printed the version of Beowulf footnoted with comments beginning on its page 37. This different printed version has a different printed content item version identifier 212 and work version identifier than the original old English form of the poem, but has the same work identifier. For content within the anthology version of the poem selected by a user, the position data of the printed content selection is in terms of page 37. In this instance, likely, the work version position data 218 and the work position data 222 indicate the same stanza.

Figure 4B:
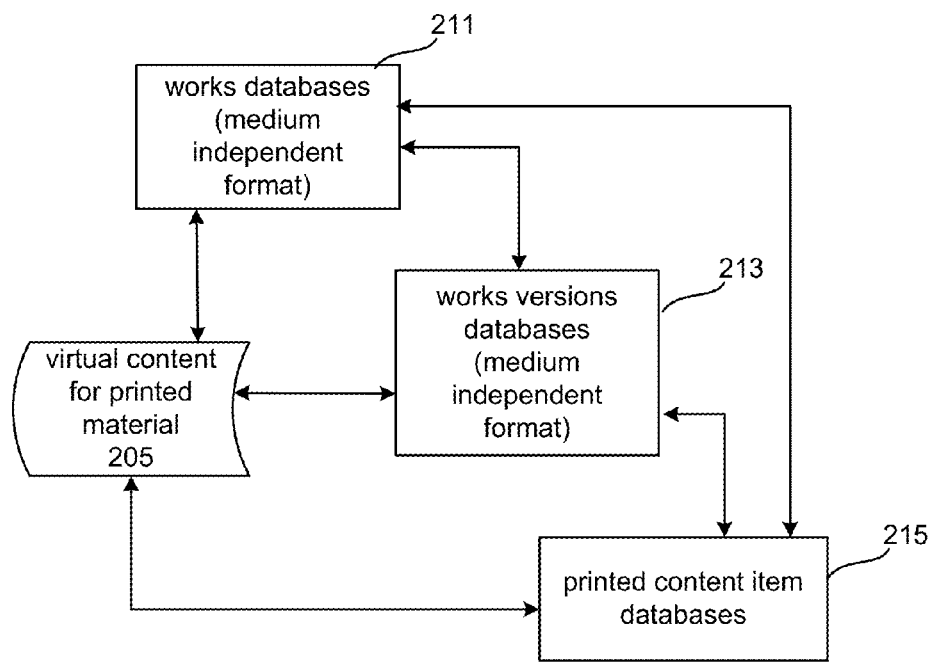
FIG. 4B illustrates examples of printed medium dependent and medium independent cross referencing content datastores.

FIG. 4B illustrates examples of printed medium dependent and medium independent content datastores, shown here as cross referencing databases. These databases 211, 213, 215 provide access to particular layouts including the content selection. The layouts may be medium independent and medium dependent. In this example, any of the printed content item version identifier 212, the work version identifier 216 or the work identifier 220 can be used to cross-reference or index into any of the medium independent works 211 and works versions databases 213 and the medium dependent or layout specific printed content item databases 215. The layouts or position data of a work, any work versions and the various printed content item versions of the work are crossed referenced as well. Again, some examples of medium independent subdivision identifiers may be paragraphs, stanza, verses or the like which provide a medium independent organization to the work or a work version. Paragraph 80 in a work can be cross-referenced to page 16 in one printed content item version and to page 24 in a larger print edition of the work in another printed content item version. Via the printed content item version identifier 212, a developer can link to the print layout of the print version, e.g. a particular edition, in the printed content items databases 215. Print layout includes things like page numbers, margin width, header and footer page content, font size, location of illustrations and photographs and their size on the page and other such layout specific information.

Publishers may provide access to their datastores of copyrighted works for identification purposes and as a reference for the layout of the work, work version or printed version for developers of virtual content. By being able to access the layout of the works, particular work versions and particular printed content item versions, developers can create virtual content 205 for medium independent and medium dependent versions of a work. As illustrated, the databases 211, 213 and 215 and the virtual content 205 may cross-reference each other.

For works not subject to copyright, datastores under control of libraries, particularly those with large collections like the Library of Congress, other national libraries, universities, and large public libraries, and book compilation websites like Google Books® and sites maintained by universities may be searched for copies of a work, a work version or a printed content version for layouts to which to reference position data 214, 218, 222.

Embodiments of methods for the technology and example implementation processes for some of the steps of the methods are presented in figures below. For illustrative purposes, the method embodiments below are described in the context of the system embodiments described above. However, the method embodiments are not limited to operating in the system embodiments described above and may be implemented in other system embodiments.

FIG. 5 is a flowchart of an embodiment of a method for making static printed content dynamic with virtual data. The object recognition engine 192 may recognize an object as an item of printed material, e.g. a book or periodical or simply a sheet of paper, in a field of view of a see-through, mixed reality, display device, and the dynamic printed material application 202 is notified of the object recognition by the operating system 190. In step 302, the dynamic printed material application 202 identifies the printed content item and in step 304 identifies user selection of a printed content selection within the printed content item based on physical action user input.

In step 306, the dynamic printed material application 202 determines a task for the printed content selection based on physical action user input, and in step 308, performs the task. Virtual data related to the printed content selection is displayed in accordance with the task in step 310.

Some examples of tasks are an interactive task which displays and updates interactive virtual content, e.g. games, responsive to user input, a Snippet® tool which allows a user to select printed content and send it to another user via a messaging application like email, instant messaging or Short Message Service (SMS), an annotation application, a language translation application, a search task, a bring up-to-data application, a definition application, a follow-me application which creates a virtual version of printed content which the user can manipulate in his or her field of view while no longer looking at the actual printed content, a readability application for improving visibility of content and comfort during reading, and a redaction and refresh application which generates an unmarked version of printed content. For example, a marked up version of printed content may include underlining, scribbles, and notes in the margin which make the content almost unreadable. For example, a user having only an abridged version of a work may define a task which fills in the content deleted. Another example is a restore application in which a user identifies missing pages, and they are displayed. As mentioned above, a user can define tasks as well.

FIG. 6 is a flowchart of an embodiment of a process for identifying a printed content item in a field of view of a see-through, mixed reality display device. In step 312, the dynamic printed material application 202 electronically outputs instructions requesting a user to place one or more version identifying sections of the printed content item in the field of view of the display device 2. Some examples of version identifying sections are the ISBN, ISSN and SICI numbers discussed above, a cover of a book or magazine, a title page, a front page, a table of contents, and a copyright page. The copyright page of a book often provides in a standardized format an ISBN number, the title, the print date, edition, author, publisher and information about earlier copyrights. The one or more version identifying sections may be identified in image data, for example based on templates for a copyright page or a template for the standardized number formats for ISBN, ISSN and SICI and data extracted and put into predetermined search fields like text, author, publisher, etc. In other examples, text on the page may be identified based on alphabet structure data 200 and converted to a computer standard text data format for a query.

In step 314, a query is formulated based on the one or more version identifying sections and sent in step 316 to a search engine for a printed content item version identifier. The dynamic printed material application 202 receives a printed content item version identifier in step 318. Optionally, in step 320, responsive to verifying the identity of the printed content item, the dynamic printed material application 202 receives a medium independent work identifier and any applicable medium independent work version identifier. The dynamic application 202 may also receive a work identifier and work version identifier by using the printed content item version identifier 212 as an index into publisher databases 207 or Internet indexed resources 209.

Figure 7A:
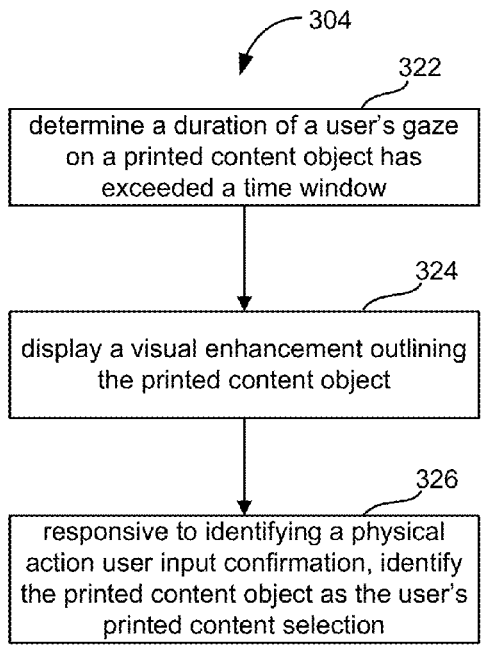
FIG. 7A is a flowchart of an implementation example of a process for identifying at least one physical action of a user's eye selecting a printed content selection.

FIG. 7A is a flowchart of an implementation example of a process for identifying at least one physical action of a user's eye selecting a printed content selection. The eye tracking software 196 identifies a position of the eye in the socket typically based on pupil position, but iris position may also be a basis. In step 322, the dynamic printed material application 202 determines a duration of a user's gaze on a printed content object has exceeded a time window and, in step 324, causes the image generation units 120 to display a visual enhancement outlining the printed content object. In step 326, responsive to identifying a physical action user input confirmation, the dynamic printed material application 202 identifies the printed content object as the user's printed content selection. Some examples of a physical action user input confirmation are an action like a blink, gesture or voice command indicating "yes" or "select" or a request for a task. The user may indicate other than a confirmation by a physical action on the visual enhancement, e.g. an outline, like reshaping it to include more or less content, or a gesture, blink or voice command indicating "no" or "cancel."

Figure 7B:
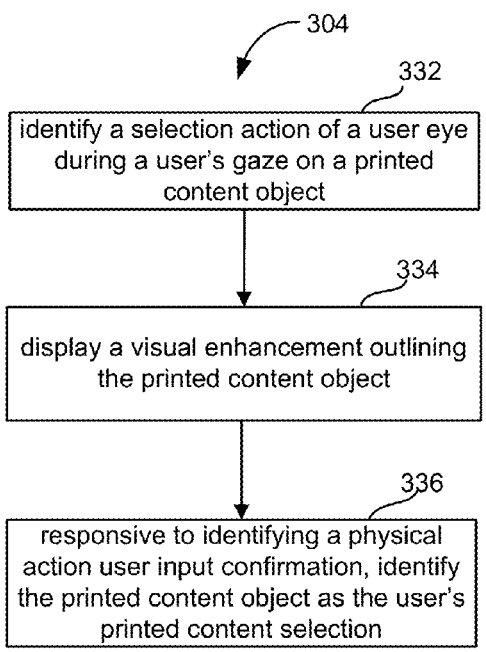
FIG. 7B is a flowchart of another implementation example of a process for identifying at least one physical action of a user's eye selecting a printed content selection.

FIG. 7B is a flowchart of another implementation example of a process for identifying at least one physical action of a user's eye selecting a printed content selection. In step 332, the dynamic printed material application 202 identifies a selection action of a user eye during a user's gaze on a printed content object, and in step 334, causes the image generation units 120 to display a visual enhancement outlining the printed content object. In step 336, responsive to identifying a physical action user input confirmation, the dynamic printed material application 202 identifies the printed content object as the user's printed content selection.

Figure 7C:
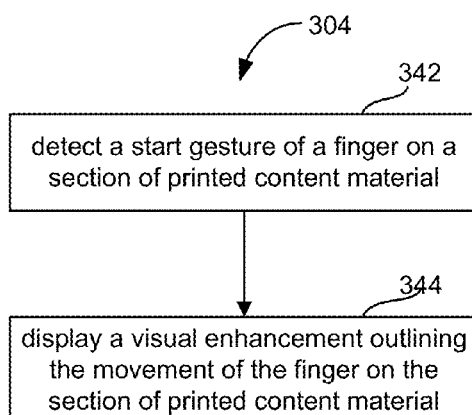
FIG. 7C is a flowchart of an implementation example of a process for identifying at least one physical action of a gesture selecting a printed content selection.

FIG. 7C is a flowchart of an embodiment of an implementation example of a process for identifying at least one physical action of a gesture selecting a printed content selection. In step 342, the dynamic printed material application 202 receives notification that a start gesture of a finger on a section, e.g. a page, of printed content material has been detected, and in step 344 causes the image generation units 120 to display a visual enhancement outlining the movement of the finger on the section of printed content material. In step 346, the dynamic printed material application 202 receives notification that a stop gesture of the finger on the printed content material has been detected. As fingers are typically on some portion of a page or sheet or card a user is reading, the start and stop gestures make a clear distinction of when a user is making a request as opposed to simply moving finger positions. Other process examples may not require a start and stop gesture and instead distinguish movements from gestures based on monitoring user finger behavior over time. In step 348, responsive to identifying a physical action user input confirmation, the dynamic printed material application 202 identifies the printed content object as the user's printed content selection.

Figure 8A:
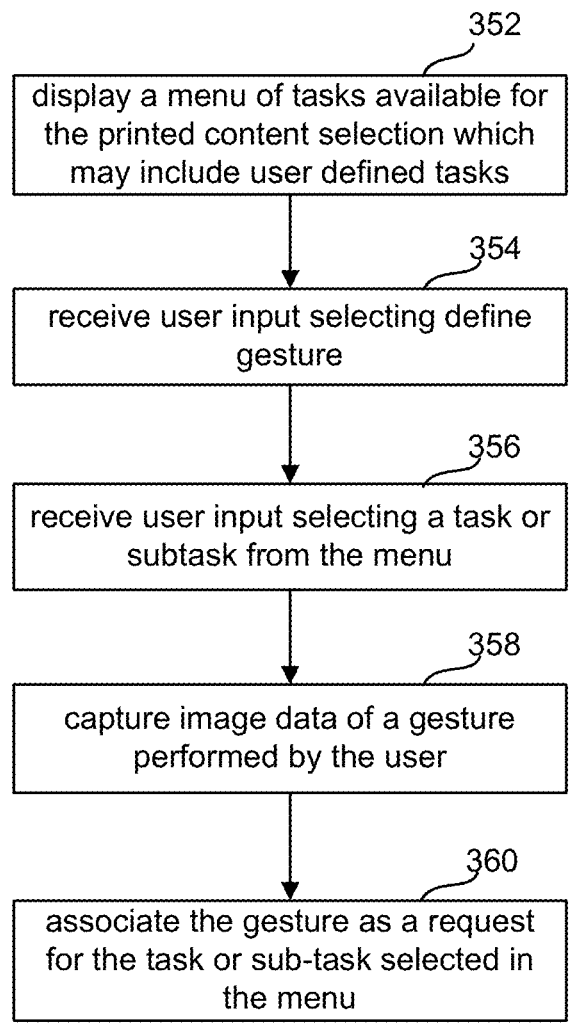
FIG. 8A is a flowchart of an implementation example of a process for generating and associating a user-defined gesture with a task.

FIG. 8A is a flowchart of an implementation example of a process for generating and associating a user-defined gesture with a task. The dynamic printed material application 202 in step 352 displays a menu of tasks available for the printed content selection which may include user defined tasks. An example of a user defined task would be a user selects content and performs a query for commentaries on the content. The user can save the specific search query, or save the search terms for criteria for commentaries as a task. When a user selects the commentaries task for a different content selection, commentaries for the different content selection are retrieved.

The dynamic printed material application 202 in step 354 receives user input selecting define gesture, and in step 356, receives user input selecting a task or subtask from the menu. The outward facing cameras 113 in step 358 capture image data of a gesture performed by the user of which the dynamic printed material application 202 is notified and in step 360, the dynamic printed material application 202 associates the gesture as a request for the task or sub-task selected in the menu.

Some printed material like books and periodicals may be printed with a layout including designated spots for virtual content. For example, next to a photograph with a marker with metadata identifying the photograph and related virtual content or data may be a space of predetermined dimensions where the related virtual data fits. The space may also have a marker, e.g. an RFID tag or an IR marker, identifying the virtual content to display there. However, even for content pre-printed for augmentation by virtual data, a user may activate a task such as a search task and receive data for which the page has not been preformatted. The software executing in the computing environment 54 on the display device system 8, the remote computer system 12 or both determines where to place the virtual data. A user may also designate placement through physical action. For example, a user may gaze at virtual data for a duration and then gaze at a blank spot on a sheet or a page. In another example, a user may point to a virtual object with a finger and drag the finger to another spot on the sheet or page.

Figure 8B:
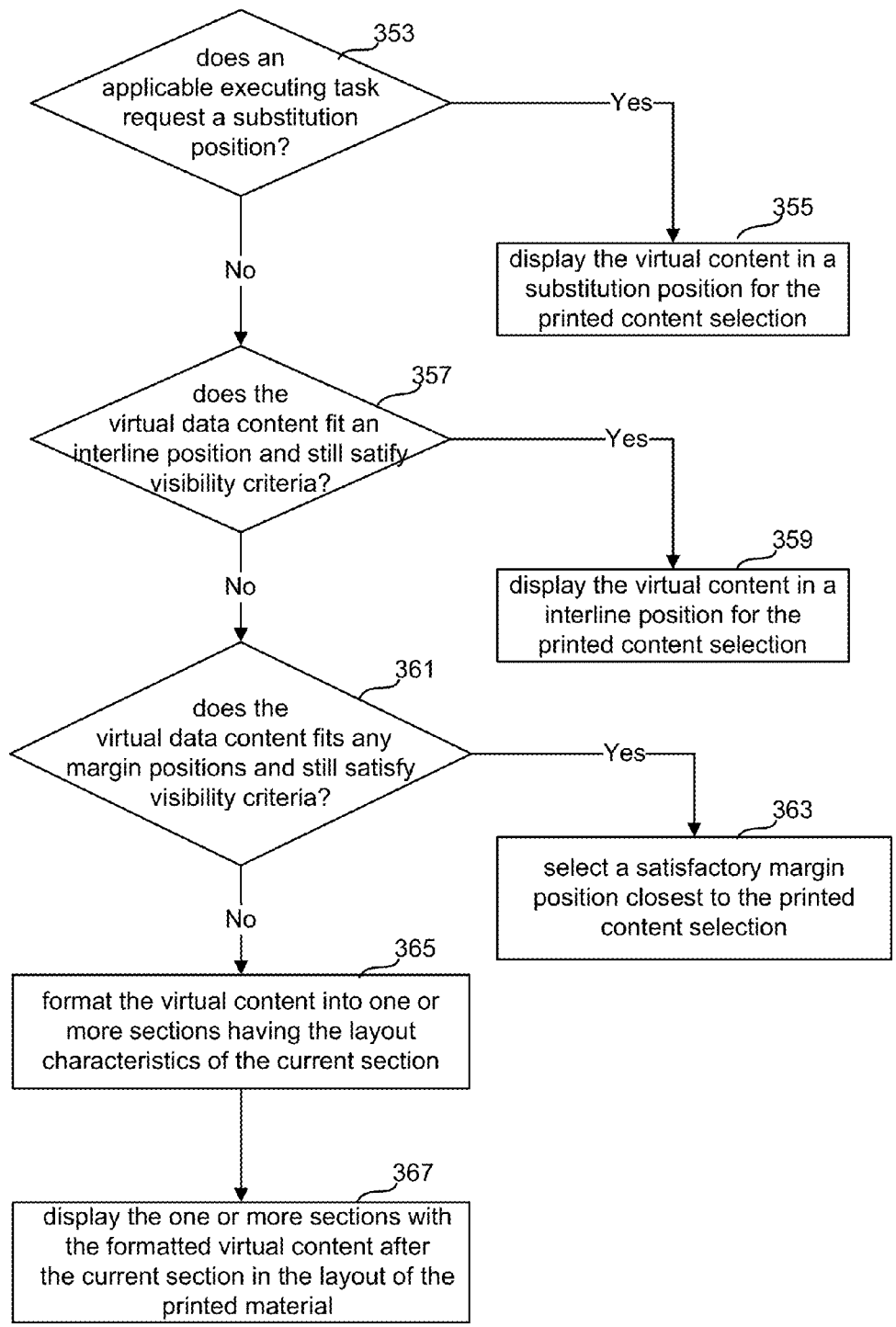
FIG. 8B is a flowchart of an implementation example of a process for determining placement of virtual data with respect to printed material.

FIG. 8B is a flowchart of an implementation example of a process for determining placement of virtual data with respect to printed material. In this example, the dynamic printed material application 202 has a number of predetermined position options in relation to the printed content selection from which to select. A user can move the virtual data as he or she prefers from the predetermined positions. In this example, in step 353, the dynamic printed material application 202 determines whether an applicable executing task requests a substitution position. For example, a task may be a personalization task with a sub-task of changing or inserting character names to those of the reader and one or more user designated people. If substitution intended, the dynamic application 202 displays the virtual content in a substitution position for the printed content selection in step 355. In step 357, responsive to an executing task not requesting a substitution position, the dynamic printed material application 202 determines whether the virtual data content fits an interline position and still satisfies visibility criteria. An interline position is a space between lines of text, or between a line of text and a picture, or a space between pictures. An example of visibility criteria is whether the size of the virtual content to fit the interline position would be too small for a human with average eyesight to read at a comfortable reading position. Whether the virtual data content fits an interline position can be determined based on what percentage of the content can be displayed at an interline position and still be visible. A synonym as a definition is an example of content which may fit an interline position and still satisfy visibility criteria. An interline position is typically not suitable for a picture. If an interline position is suitable, the dynamic application 202 displays the virtual content in an interline position for the printed content selection in step 359.

If the interline position is not suitable, in step 361, the dynamic application 202 determines whether the virtual data content fits any margin positions and still satisfies visibility criteria. If one or more satisfactory margin positions are available, the dynamic application 202 selects a satisfactory margin position closest to the printed content selection in step 363. If a satisfactory margin position is not available, the dynamic printed material application 202 formats the virtual content into one or more sections having the layout characteristics of the current section in step 365 and in step 367, displays the one or more sections with the formatted virtual content after the current section in the layout of the printed material. An example of a current section is a page. Layout characteristics for a page as a section include typical page layout settings. Some examples of such settings are margins, page number placement, interline spacing, spacing around pictures, font and font size. Some examples of the layout of the printed material may be a newspaper, a book, a magazine, or a greeting card. In the example of printed material as a book, the one or more sections formatted with the virtual content may be made to appear as additional pages of the book.

In the example of FIG. 8B, the virtual data is formatted to appear within the perimeter of the physical printed material. In other examples, a floating position may also be a position option. For example, a margin space may appear to be extended to include a picture linked to a content selection for which annotations already take up the nearest margin space. In another example, a floating explanatory paragraph may appear to pop up perpendicularly out of the page in an interline space near a concept it explains. In the embodiment of FIG. 15 below, a virtual version of the printed content selection may be assigned a floating position linked to a user field of view rather than the printed material itself FIGS. 9A through 15 illustrate example embodiments of tasks which may be requested by a user and which generate or result in virtual data for display.

Figure 9A:
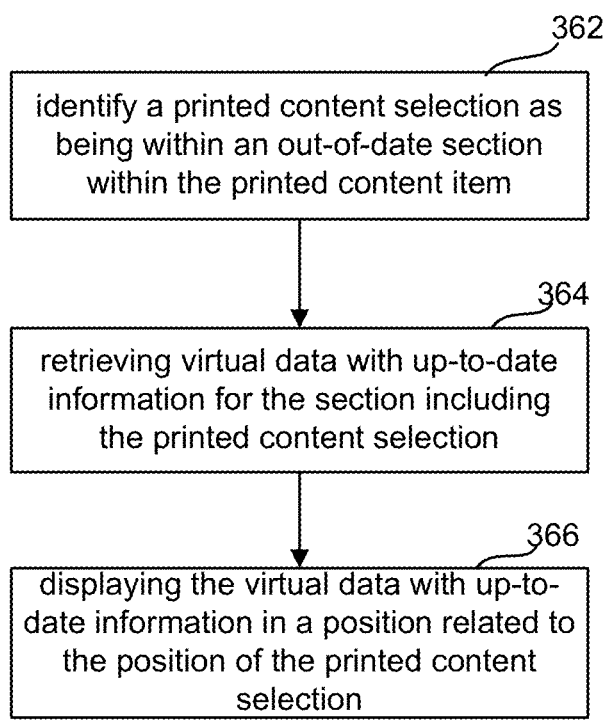
FIG. 9A is a flowchart of an embodiment of a method of performing a task of bringing a content selection up-to-date.

FIG. 9A is a flowchart of an embodiment of a method for performing a task of bringing a content selection up-to-date. The dynamic printed material application 202 in step 362 identifies a printed content selection as being within an out-of-date section within the printed content item. One way the printed content selection may be identified as being out-of-date is a publisher has identified out-of-date content in its stored version of the layout of the printed content version. For example, the publisher provides descriptive metadata including position data in the layout of out-of-date information.

In one example, the dynamic printed material application 202 identifies out-of-date sections in a printed content item by sending a search query including a printed content version identifier to a search engine which requests identification of out-of-date sections. Responsive to the search results identifying out-of-date sections, the dynamic application 202 receives the metadata with the position data in the layout of the printed content item.

A data access identifier like a Uniform Resource Locator (URL) may be included in the metadata for up-to-date virtual data which replaces the out-of-date section. The metadata may be in a standardized format using a markup language like Extensible Markup Language (XML) for interfacing with applications through an application programming interface (API). In the example above, the dynamic printed material application 202 requests the up-to-date virtual data based on the printed content version identifier and the position data.

When such a data access identifier is received by the publisher's database manager, virtual up-to-date data for substitution of the out-of-date material is sent to the sender of the data access identifier. In step 364, the dynamic printed material application 202 retrieves virtual data with up-to-date information for the printed content selection, for example from the publisher's databases 207, and in step 366 displays the virtual data with up-to-date information in a position related to the position of the printed content selection. For example, a substitution or floating position can be designated for the up-to-date virtual data. In other examples, the dynamic printed material application 202 may search Internet indexed resources 209 for virtual data related to the printed content item as well, and retrieve up-to-data content for the printed content selection from an independent developer of virtual content.

Figure 10A:
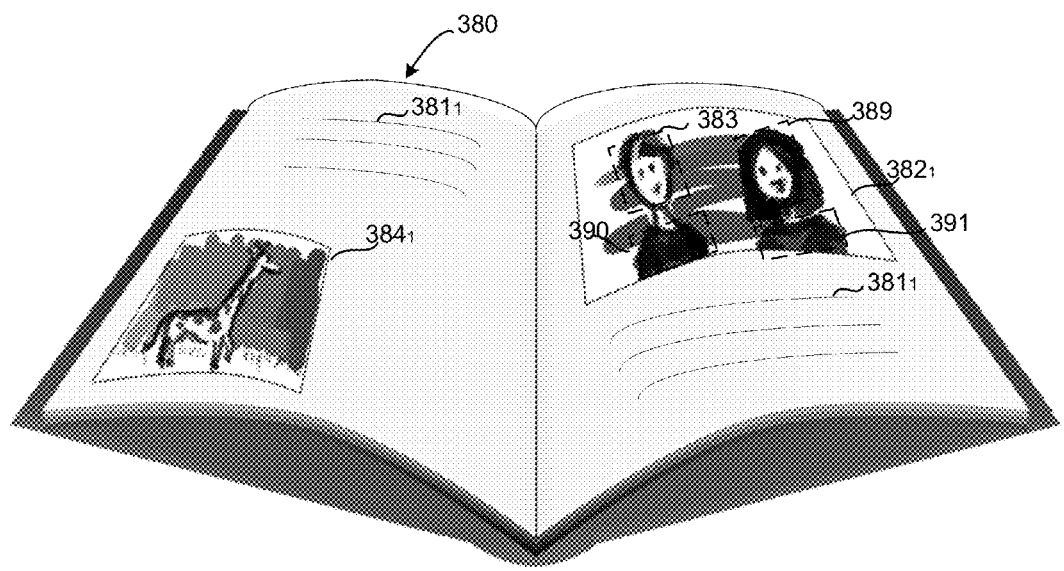
FIG. 10A illustrates an example of static printed material which is out-of-date and which includes invisible markers.

FIG. 10A illustrates an example of static printed material which is out-of-date. In this example, a math exercise book 380 for children printed 10 years ago includes a picture $384_1$ of a giraffe who had the fastest speed clocked by a radar gun in an experiment performed 11 years ago by explorers pictured in photograph $382_1$. Since then, the design of the radar gun has been improved, and the same explorers performed the same experiment last year, and recorded an even faster speed by a lion. Text sections $381_1$ and $381_2$ provide math problems, and explain the changes in the radar gun which made it capable of capturing a faster speed.

Figure 10B:
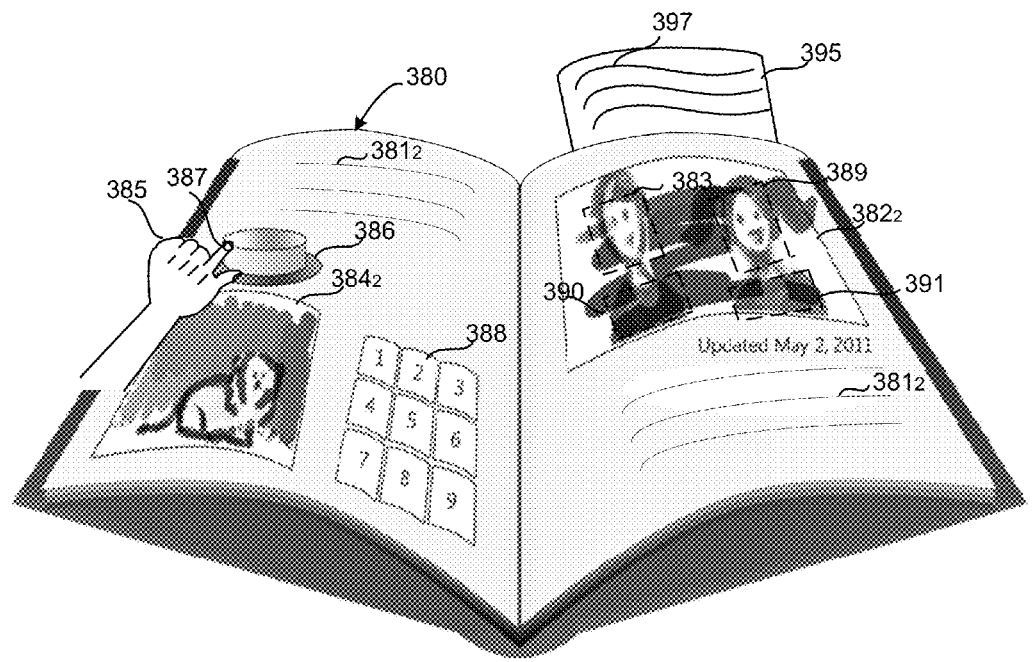
FIG. 10B illustrates examples of inserting virtual data to bring content up-to-date and interactive virtual content and displaying search results.

FIG. 10B illustrates examples of inserting virtual data to bring the content of FIG. 10A up-to-date and interactive virtual content. In this example, math exercise book 380 has virtually erased the picture of the giraffe $384_1$ and overlaid with substituted image data $384_2$ of the mountain lion in the layout position of the picture. Additionally, the picture of the explorers $382_1$ from ten years ago has been updated with a substituted more recent picture $372_2$. An interaction point 386 is illustrated as an interactive button hologram 386. From image data captured by the outward facing cameras 113, a physical action of finger 387 of hand 385 is detected pressing the virtual button which causes virtual calculator 388 to appear which may make the math problems in sections $381_1$ and $381_2$ more fun to do.

As the see-through, mixed reality display device system is capable of producing virtual objects in three dimensions (3D), the picture $347_2$ of the lion, and the calculator 378 lie flush on the page as if printed on the page. The 3D hologram 382 appears to come out of the page.

Another task which readers of printed content can now have performed with the display system 8 is one or more embodiments of a search task. Publishers and other indexers of content may supplement their stored layouts with a keyword associated with one or more printed content selections which may be used for searching for information related to the printed content selection. As discussed for FIG. 9C, printed material may be printed with markers, e.g. invisible RFID or IR tags or a subset of visual data, which identify different printed content selections. An example of a visible marker is a subset of image data which acts as a signature for the image data. For example, as the printed content item is identified, image data sub-elements along intersecting diagonal lines may identify a picture. The marker data is a quick reference which may cut down on processing time in identifying the printed content selection in a layout. One or more keywords may be stored and updated for each marker.

FIG. 9B is a flowchart of an embodiment of a method of performing a search based on at least one keyword associated with a printed content selection. In step 368, the dynamic printed material application 202 identifies a search request for a printed content selection of the printed content item based on physical action user input data. For example, the physical action user input may be based on eye tracking data and in particular on gaze data. A user may have defined as some examples that a gaze duration length, an underlining gesture, or a blink sequence is an indication of a task request for searching on the printed content selection.

In step 370, the dynamic printed material application 202 may request and receive at least one keyword associated with the printed content selection from one or more printed content related datastores and in step 372, formulates a search query based on the at least one keyword received. Some examples of printed content related datastores are the printed content related Internet indexed resources 209 and the publishers databases 207. In step 374, the dynamic printed material application 202 sends the search query to a search engine, and in step 378, displays search results in the field of view of the see-through display. See for example, virtual data 395 of a virtual piece of paper with text search results 397 at an off-page position along the closest margin to the printed content selection of the male explorer image data which is the basis of the search.

FIGS. 10A illustrates an example of static printed material which is out-of-date and which includes invisible markers on the faces, 383 and 389, and clothes (390, 391) of the explorers. These markers may have been pre-printed with the text. Additionally, the dashed lines representing the markers may represent markers generated after printing and associated with the layout of the printed content item. An example of such a marker is the image data signature discussed above. Even a used printed copy of a book can be linked and updated with keywords. For example, one or more keywords associated with a character name may be updated for a 1937 printing of "The Three Musketeers" every time a new actor plays the character in a new film version of the novel.

FIG. 9C is a flowchart of an embodiment of a method of performing a search based on at least one keyword associated with a marker for a printed content selection within a subdivision including other markers. In step 369, a marker of a printed content selection within a subdivision of the printed content item is identified from a plurality of markers for the subdivision based on physical action user input data. For example, a sensor like an IR or RFID sensing unit 144 detects a signal from the marker which includes data which the unit 144 converts to a processor readable form for processing unit 210. The data identifies the printed content selection within the subdivision and may include one or more keywords in some examples.

In another example, a visual marker may be stored as structure data 200, and the object recognition software 192 identifies the visual marker from image data captured by the cameras 113 and notifies the processing unit 210 of a marker identifier which the processing unit may send to a publisher database 207 or printed content related Internet indexed resources 209 for one or more associated keywords.

A subdivision as discussed above may be a paragraph or a picture or a stanza. Gaze data allows the system to pinpoint within the subdivision where the user is focused, for example on what word or words within a paragraph or at what object in a photo the user is looking. Keywords can be assigned at a very detailed level. Gaze duration, gaze with blinking, and gestures with finger pointing and voice data for refinement or clarification may be used to select content within a subdivision.

In step 371, the dynamic printed material application 202 selects a search task for the printed content selection based on physical action user input data. As discussed above, selection of the printed content item and a search request may be indicated at the same time. In step 373, the dynamic printed material application 202 requests and receives at least one keyword associated with the marker from one or more datastores, e.g. 207 or 209, and in step 375 generates a search query based on the at least one keyword associated with the marker. The search query is sent in step 377 to a search engine, and in step 379, the dynamic application 202 causes the display of the search results in the field of view of the see-through display.

FIG. 10B illustrates an example of inserting virtual data displaying the search results as mentioned above. In the example of FIG. 10B, the invisible markers 383, 389, 390 and 391 still send out signals despite the overlay of virtual data. The processing unit 210 can include keywords associated with the virtual data in the search query as well, particularly when the virtual data is identified as related to the printed content selection. For example, the dynamic printed material application 202 determines this based on the bring up-to-date task being executed as well.

Figures 11A, 11B:
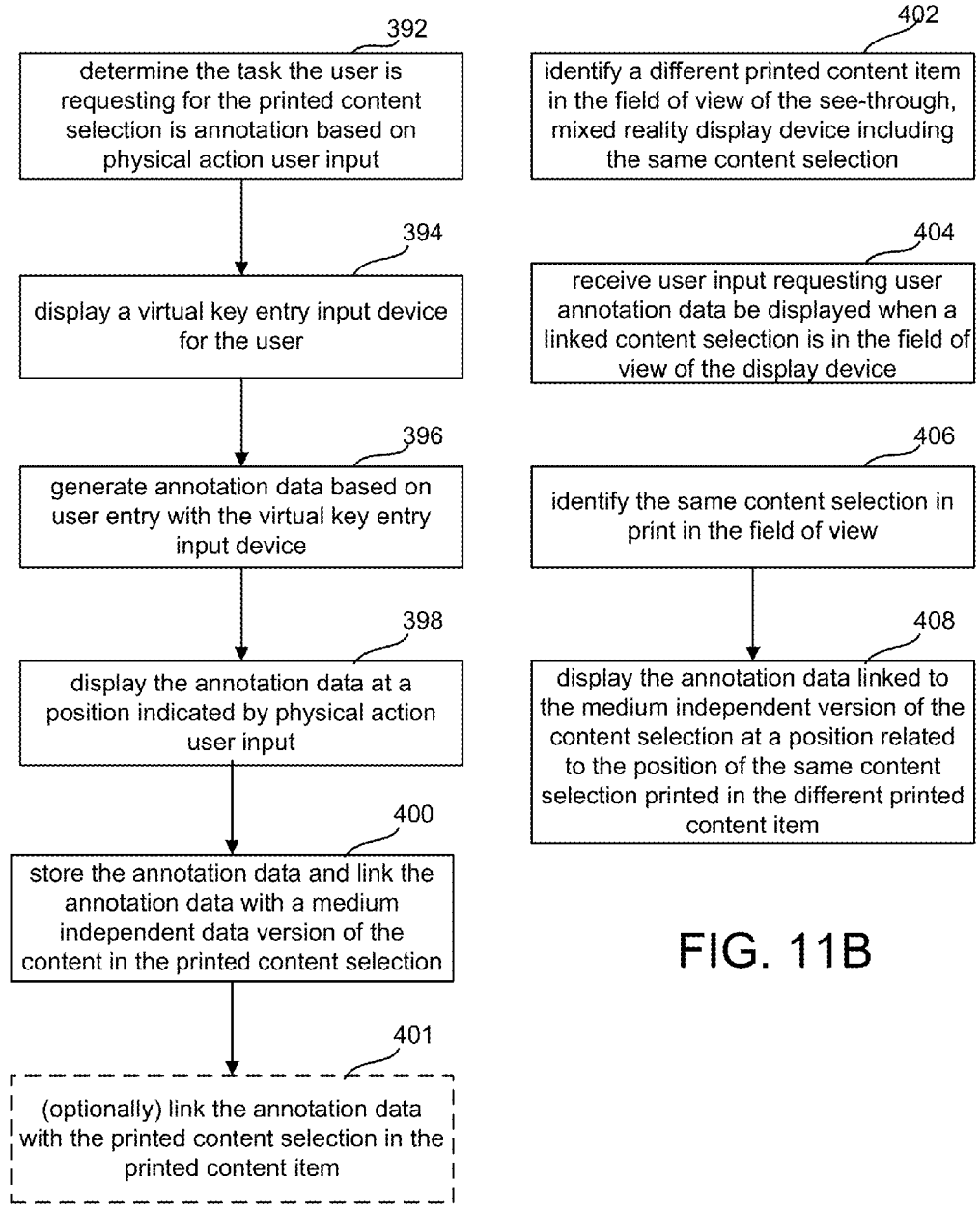
FIG. 11A is a flowchart of an embodiment of a method for annotating static printed content with virtual data.
FIG. 11B is a flowchart of an embodiment of a method for displaying stored annotations entered for one version of a work for another printed version of the work.

FIG. 11A is a flowchart of an embodiment of a method for annotating static printed content with virtual data. The dynamic printed material application 202 in step 392 determines the task the user is requesting for the printed content selection is annotation based on physical action user input, and in step 394 causes the image generation unit 120 to display a virtual key entry input device for the user. For example a virtual smartphone keypad may be displayed which a user can use with both hands to select keys as if entering a text message as some people are extremely fast texters. In other examples, a virtual QWERTY keyboard or other typical computer keyboard may be displayed for a user to interact with.

The dynamic printed material application 202, in step 396, generates annotation data based on user entry with the virtual key entry input device and, in step 398, displays the annotation data at a position indicated by physical action user input. In step 400, the annotation data is stored and linked to the annotation data with a medium independent data version, e.g. a work or work version, of the content in the printed content selection. By storing annotations with a medium independent version, the user can recall the annotations regardless of the particular print layout of the work. Optionally, in step 401, the annotation data can be linked with the printed content selection in the printed content item as well as this is a version a user is typically using at the current time.

In other examples, instead of a virtual key entry input device, annotation data may be entered via the processing unit, e.g. a mobile device 4 like in FIG. 1C. Also as indicated in the example of FIG. 12A, handwritten notes can be made into and displayed as annotation data.

FIG. 11B is a flowchart of an embodiment of a method for displaying stored annotations entered for one version of a work for another printed version of the work. In step 402, the dynamic printed material application 202 identifies a different printed content item in the field of view of the see-through, mixed reality display device including the same content selection. For example, the different printed content items have different printed content item version identifiers 212 but the same work identifier 220. The position data of the printed content items, the work versions and the works can also be cross-referenced in the databases 211, 213 and 215 by a publisher, university, library or other entity maintaining Internet indexed resources. In step 404, user input is received requesting user annotation data be displayed when a linked content selection is in the field of view of the display device. In step 406, the dynamic application 202 identifies the same content selection in print in the field of view and, in step 408, displays the annotation data linked to the medium independent version of the content selection at a position related to the position of the same content selection printed in the different printed content item.

FIGS. 12A, 12B, 12C and 12D present an example of a sequence for annotating printed material with data from other printed material.

Figure 12A:
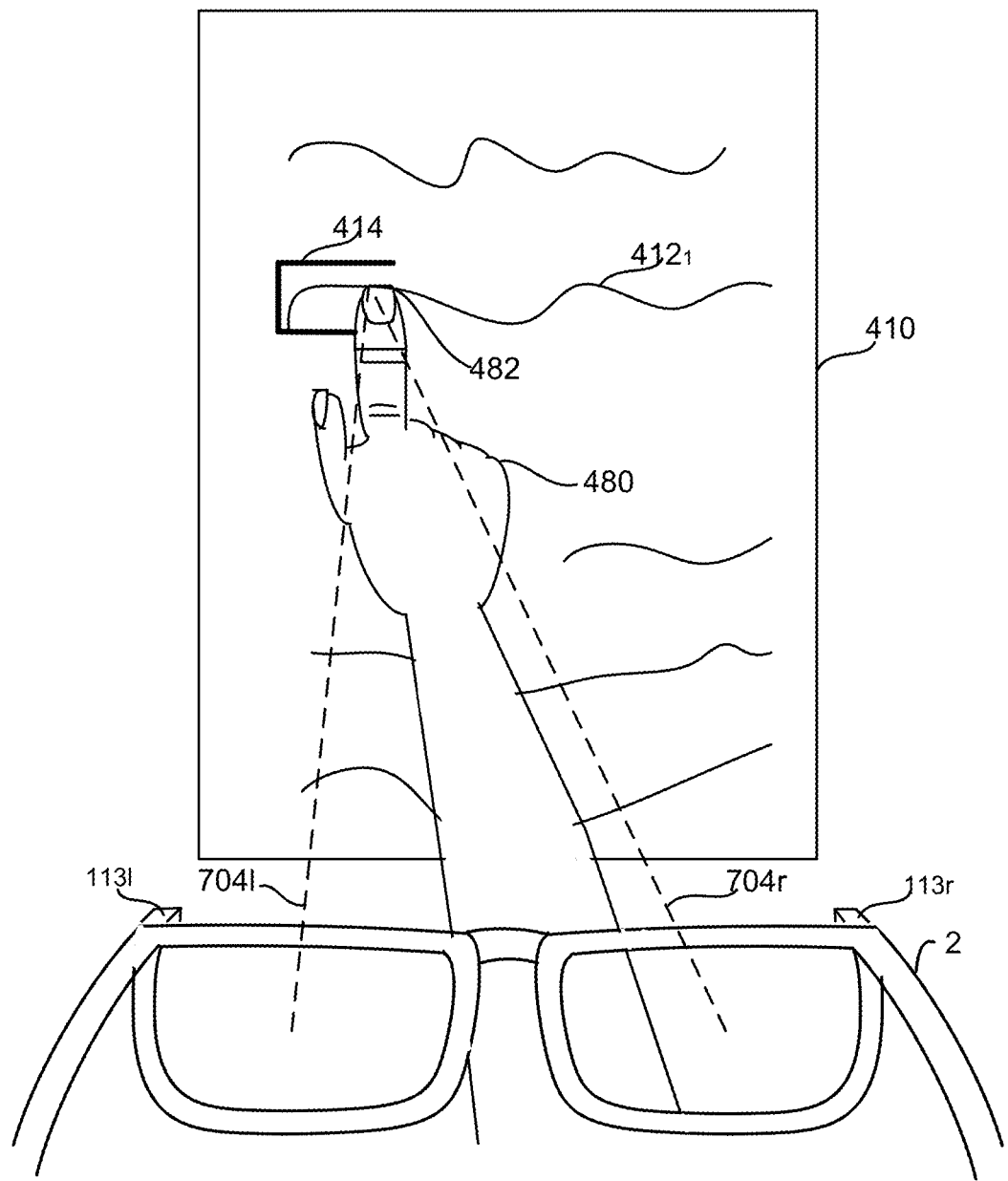
FIG. 12A illustrates an example of a gesture designating a handwritten content selection.

FIG. 12A illustrates an example of a gesture designating a handwritten content selection. Illustrated is a display device 2 with front facing cameras 113*l* and 113*r* for capturing user finger gestures. Gestures performed by other body parts such as hands, wrists, forearms and even feet, elbows and the like can also be used to control applications like dynamic application 202. Hand and finger gestures allow the user to maintain reading material in the field of view of the display simultaneously with performing a gesture. Lines 704*l* and 704*r* represent eye lines of sight approximating gaze vectors from a user's pupils or retinas. The user's hand 480 is moving across a notebook page 410 of class notes following finger tip 482 in virtually underlining handwritten text $412_1$ to be selected. An outline tool displays a highlighted box 414 for outlining the text the user is selecting. To start the sequence discussed in this set of figures, the user may have selected a make annotation sub-task from a virtual annotation task menu displayed in the field of view or may have performed a gesture or spoken words to initiate a "make annotation" sub-task. As in the example above, start and stop gestures may also be used to demarcate the beginning and end of steps in a sequence. Handwritten notes on paper or cardboard or other material capable of being printed on may be thought of as a form of printed material while a handwritten note on a computer screen would not be a printed content selection.

The dynamic printed material application 202 identifies the letters in the handwriting based on user handwriting samples stored as structure data 200 and formats the selected handwritten content as text $412_2$ in a computer standard text data format, and stores the content selection and a printed content selection metadata record 201. The handwritten content selection may also be marked as an annotation and linked to a list of annotations.

Figure 12B:
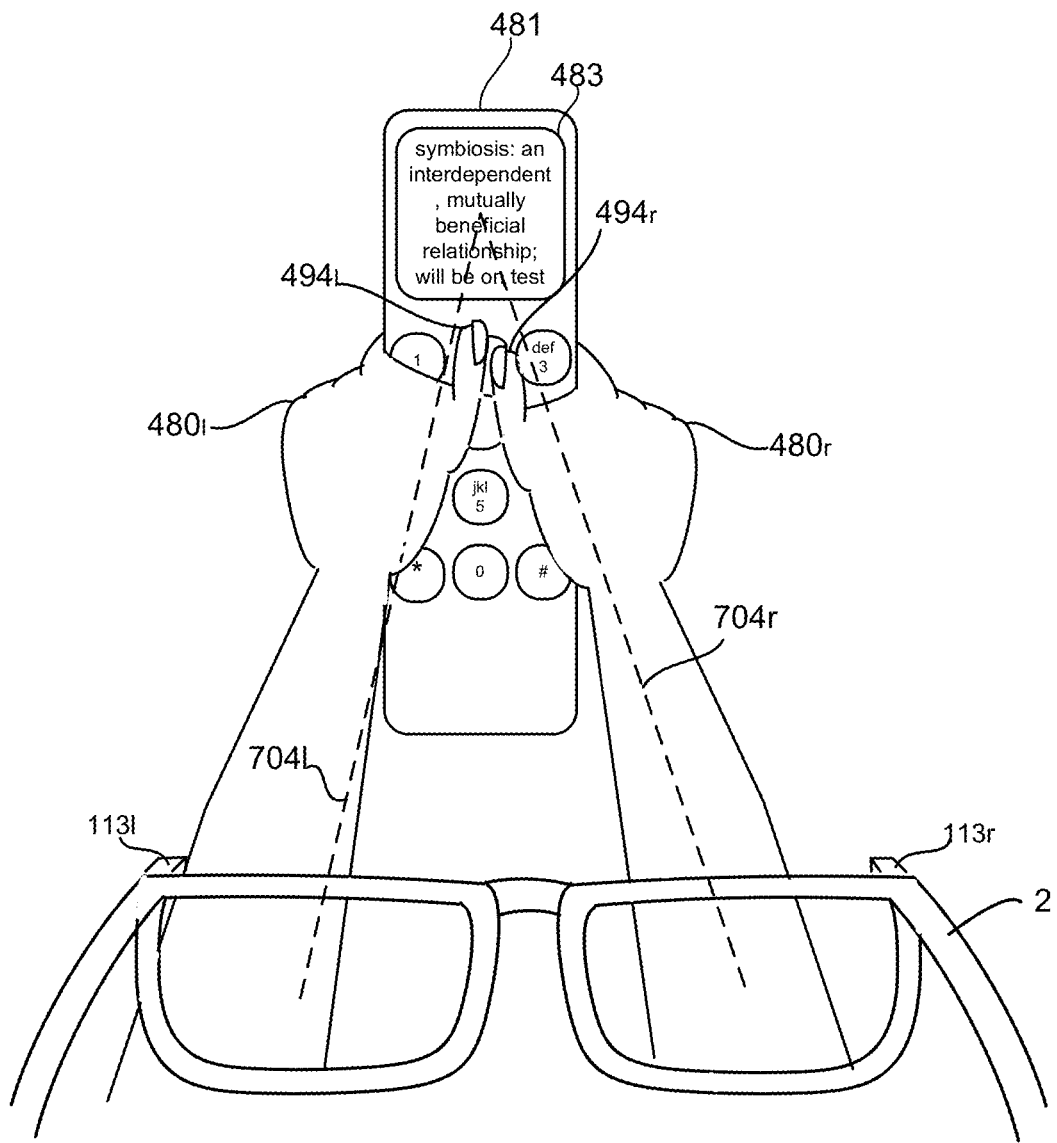
FIG. 12B illustrates an example of a virtual key entry input device displayed for a user.

FIG. 12B illustrates an example of a virtual key entry input device displayed for a user. In this example, image data of the user's thumbs 494*l* and 494*r* in relation to displayed buttons on a virtual smartphone is captured by outward facing cameras 113. Other fingers may be detected as well as all users are not as skilled texters as the average 15 year old. The user keys in an annotation of "symbiosis: an interdependent, mutually beneficial relationship; will be on test" using this virtual key entry device 481. Text is generated and displayed on the virtual phone screen 483 responsive to the user's texting. The user can hit the customary "send" "back" and such buttons just like on a real phone and communicate edits and completion of the texted annotation.

Figure 12C:
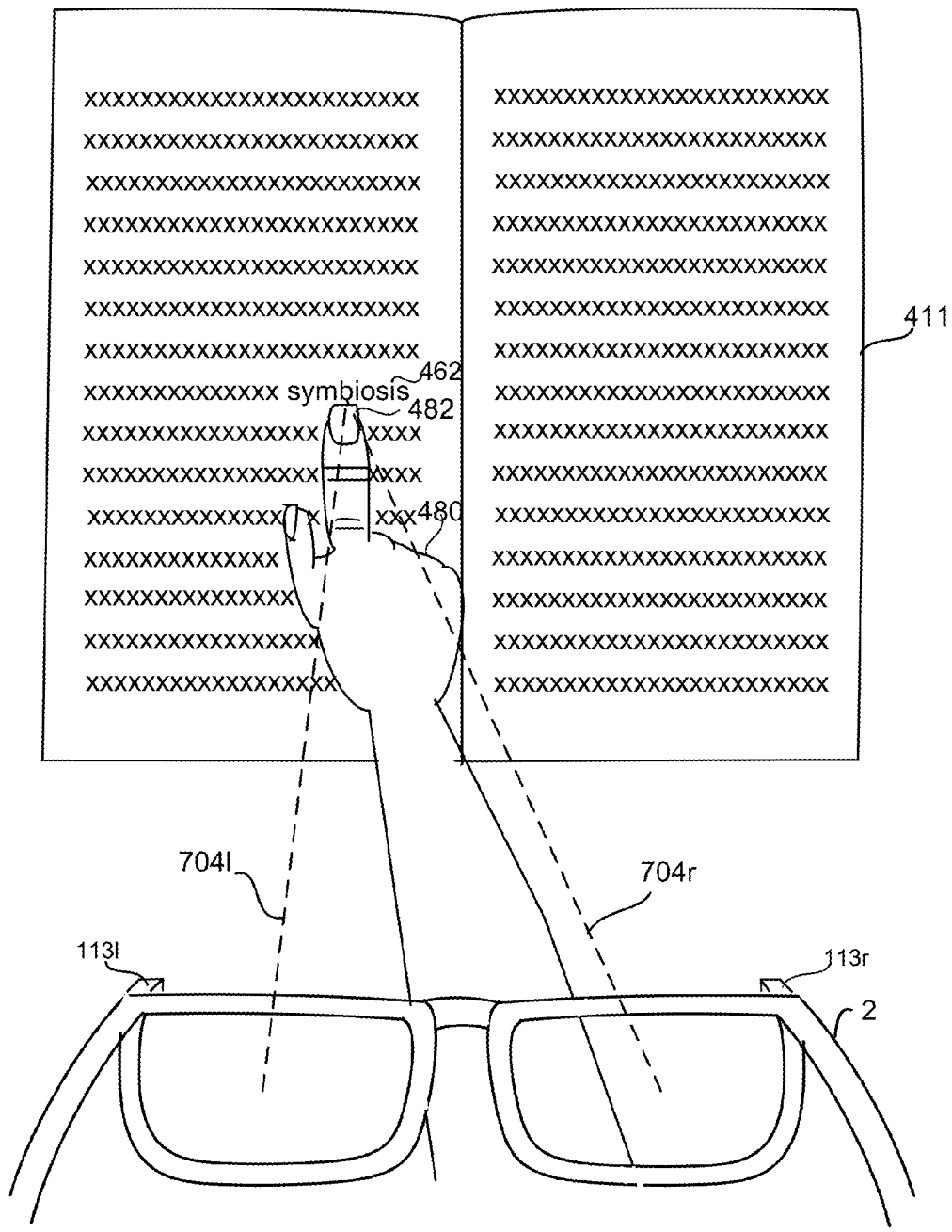
FIG. 12C illustrates an example of a finger gesture being used to select printed text for annotation.

FIG. 12C illustrates an example of a finger gesture being used to select printed text for annotation. Just as in FIG. 12A, the front facing cameras 113*l* and 113*r* capture image data of the user's finger 482 underlining the word "symbiosis" as a printed content selection 462 in a textbook.

Figure 12D:
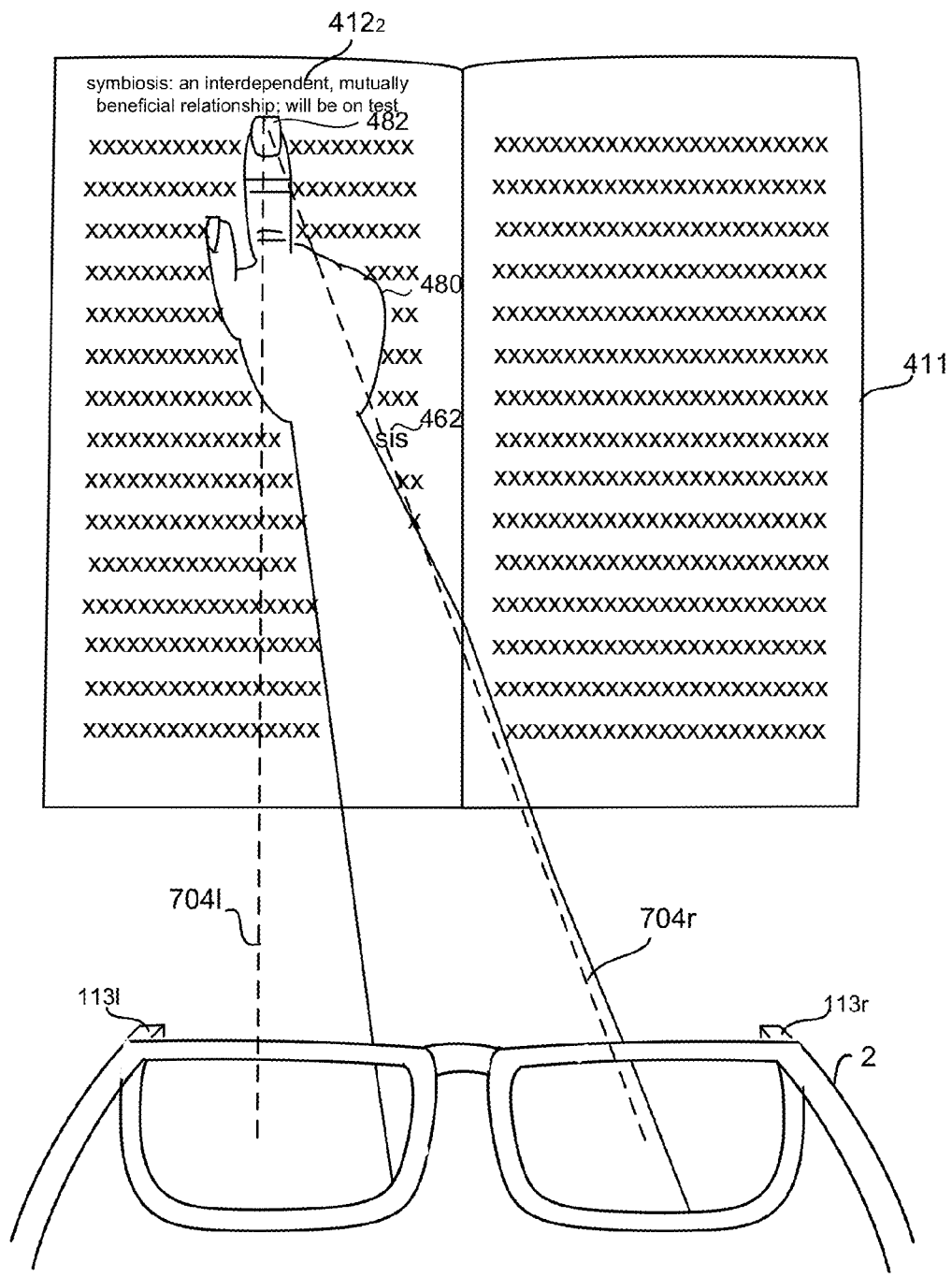
FIG. 12D illustrates an example of virtual data displaying a formatted text version of the handwritten content selection of FIG. 12A as an annotation.

FIG. 12D illustrates an example of virtual data displaying a formatted text version of the handwritten content selection of FIG. 12A as an annotation. As seen in the field of view of the display device 2 and captured by the front facing cameras 113*l* and 113*r*, after the user has performed the selection gesture of the text "symbiosis" while the annotation task is active, the user's finger 482 is identified from the image data by the dynamic printed material application 202 as pointing to a user designated top margin position on the page for the text version of the handwritten content selection. Not shown, but the user may have selected the text version $412_2$ from a virtual menu or display of recently made annotations. In another example, as the text version $412_2$ was the last annotation made in the current session, the dynamic printed material application 202 displays it. The text version $412_2$ is displayed at the top of the page and states "symbiosis: an interdependent, mutually beneficial relationship; will be on test."

Besides providing additional information or interactive content to static printed material, a virtual version can be made of the static printed content material to improve visibility of the content due to changing appearance characteristics of the content or position of the content in the display device field of view.

Figures 13A, 13B:
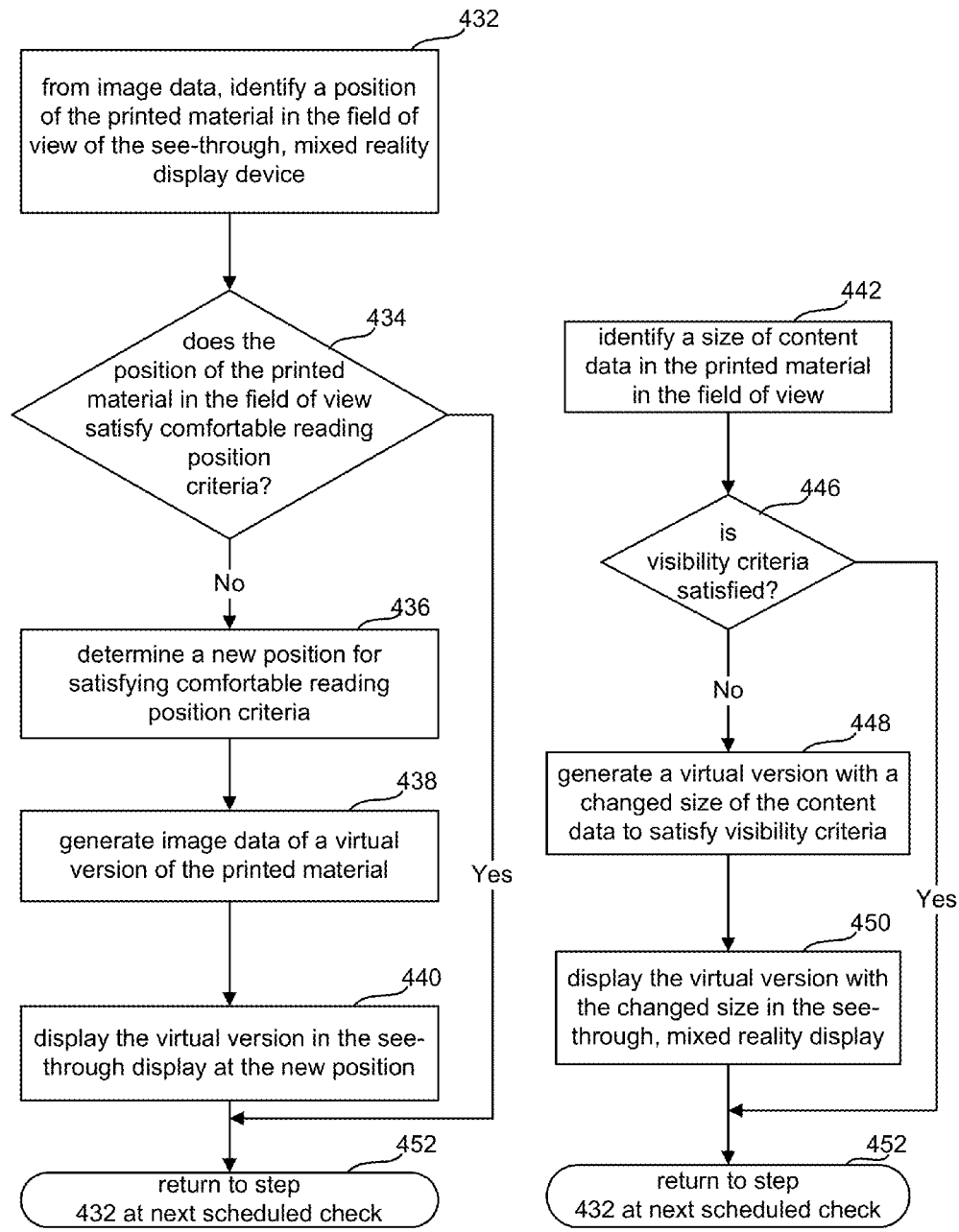
FIG. 13A is a flowchart of an embodiment of a method for providing a virtual version of printed content at a comfortable reading position.
FIG. 13B is a flowchart of an embodiment of a method for providing a virtual version of printed content for improved visibility of the content.

FIGS. 13A and 13B discuss method embodiments for improving readability of printed material by generating a virtual version of the material.

FIG. 13A is a flowchart of an embodiment of a method for providing a virtual version of printed material at a comfortable reading position. In step 432, from image data, the dynamic printed material application 202 identifies a position, which may include an orientation of the printed material in the field of view of the see-through, mixed reality display device.

In step 434, the dynamic printed material application 202 determines whether the position of the printed material in the field of view satisfies comfort criteria. Some examples of comfort criteria are angle of the printed material, e.g. a book or magazine, and angle of the text determined with respect to reference points of the display device, for example, the optical axes 142 of the see-through displays. Whether the angle of the printed material is within a comfortable reading zone may also be determined based on estimated gaze vectors and head position data derived from the orientation sensing unit 132. For example, a reference head position may be a zero degree head position meaning looking straight ahead without looking up or down or left or right at an angle. From this reference zero degree head position, a reading comfortable zone or comfort criteria may indicate a head position not more than 45 degrees from the zero degree position. A gaze estimation vector of more than 45 degrees in any direction from an optical axis 25 may be used as a threshold indicating comfort criteria is no longer satisfied.

The angle or orientation of text determination can identify whether the text is upside down or at another uncomfortable angle. A depth distance may also be determined based on stereopsis applied to the image data of the capture devices 113 or depth data obtained when the cameras 113 are implemented with depth sensing capability. If the printed material is outside a depth comfort range, e.g. 1 to 3 feet, generation of a virtual version may be triggered. A user's arm length, which may be available in user profile data 197, may be a guide for determining a depth comfort range.

If the position satisfies reading position criteria, in step 452, the dynamic printed material application 202 returns to step 432 for a next scheduled check. If the reading position criteria is not satisfied, the dynamic printed material application 202 determines a new position for satisfying comfortable reading position criteria in step 436. For example, a new position orients the book to within comfortable angle and distance boundaries of a reading comfort zone. In step 438, the dynamic printed material application 202 generates image data of a virtual version of the printed material. The virtual version may be generated based on image data of the printed material. Additionally, the dynamic printed material application 202 may generate the virtual version based on an electronic version of the printed material accessible by the dynamic printed material application 202. For example, a newspaper publisher may make an electronic version accessible with a mobile tag printed on copies of its newspapers. The electronic version may have the complete text of the printed material, e.g. the entire day's newspaper, as well as its layout information. In step 440, the dynamic printed material application 202 causes the image generation units 120 to display the virtual version in the see-through display at the new position and in step 452 returns to step 432 at a next scheduled check.

FIG. 13B is a flowchart of an embodiment of a method for providing a virtual version of printed content for improved visibility of the content. In step 442, the dynamic printed material application 202 identifies a size of content data in the version in the field of view. Whether visibility criteria is satisfied is determined in step 446. As mentioned above, in some examples, visibility criteria determines whether the size of content data is likely visible for a typical human of the user's age at the position and depth of the printed material. The methods of FIGS. 13A and 13B are complimentary. Performing FIG. 13A first may adjust any visibility issue, but even at a comfortable reading position, text may still be too large or too small. If the visibility criteria is satisfied, in step 452, the dynamic printed material application 202 returns to step 432 for a next scheduled check.

If the visibility criteria is not satisfied, then in step 448, the display printed material application 202 generates a virtual version with a changed size of the content data to satisfy visibility criteria, and in step 450 causes display of the virtual version of the content data with the changed size in the see-through display. In step 452, the dynamic printed material application 202 returns to step 432 at a next scheduled check.

Figure 14:
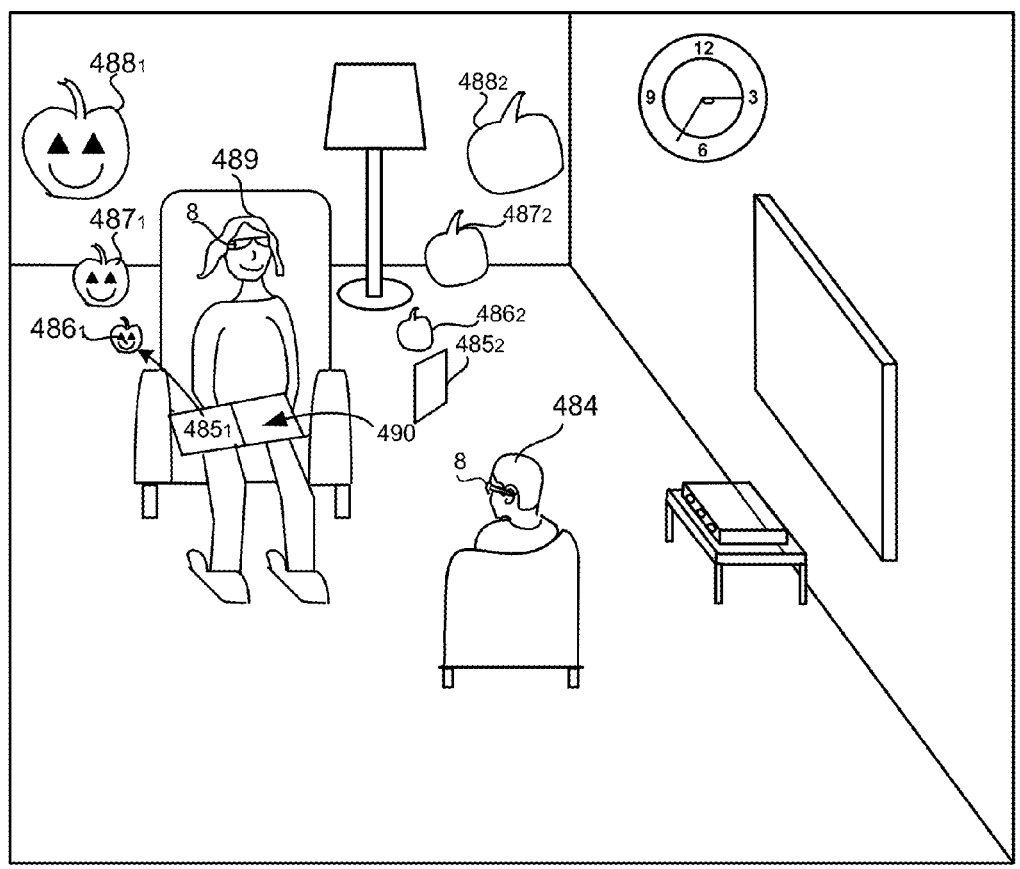
FIG. 14 illustrates an example of providing virtual data for improved visibility and a multi-user perspective shared view.
Figure 15:
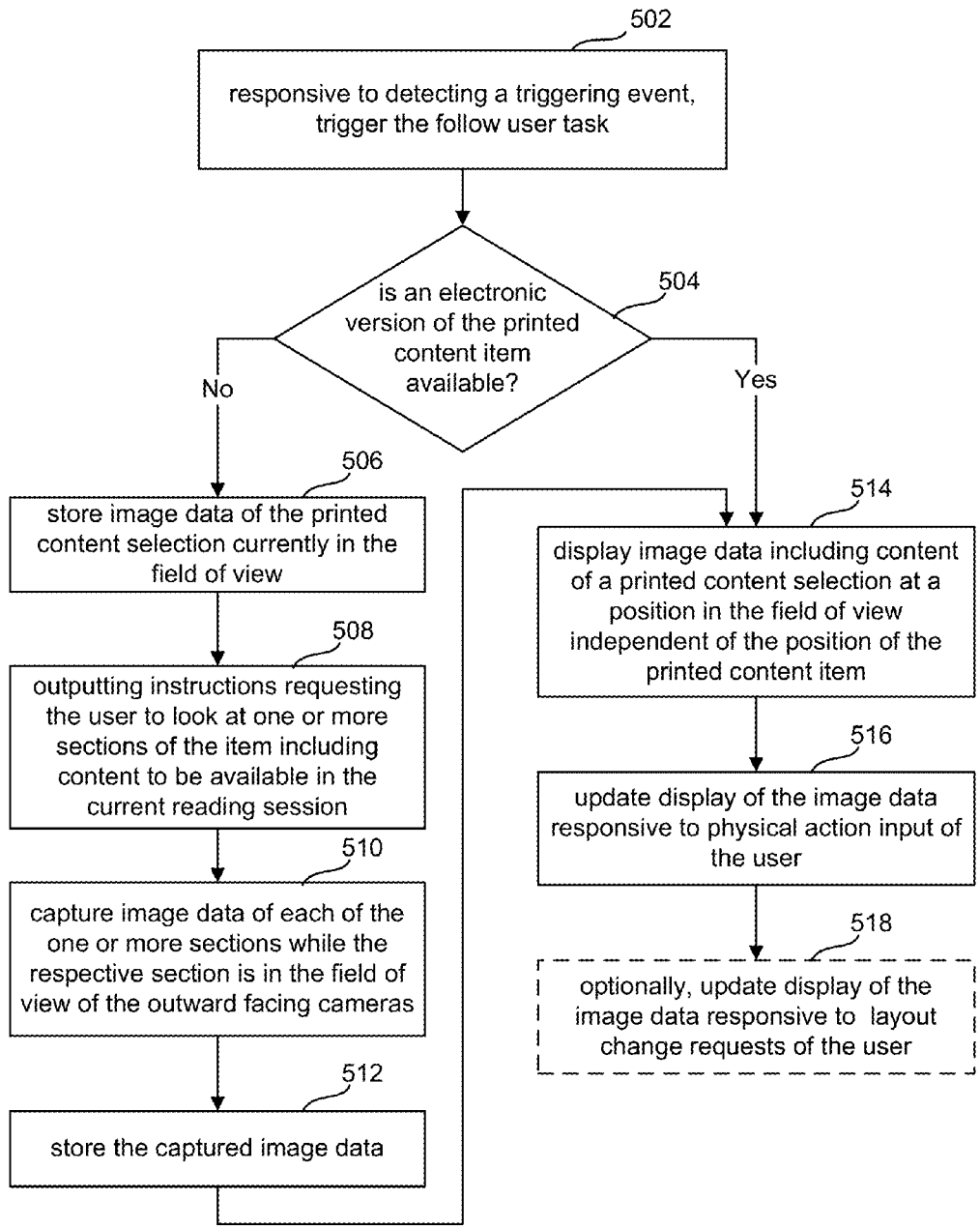
FIG. 15 is a flowchart of an embodiment of a method for providing a virtual version of printed content which is linked to the user field of view.

FIG. 14 illustrates an example of providing virtual data for improved visibility and a multi-user perspective shared view. In this living room scene, a grandmother 489 sits opposite her grandson 484 while reading him a book for which interactive virtual content is available. Each person wears a display device system 8 with all electronics incorporated in the display device 2 as per the example of FIG. 1B. In this version, the book 490 includes a processor and memory which stores the virtual data for the book in a markup language. For example, Extensible Markup Language (XML) may be used. In another example, a markup language like Virtual Reality Modeling Language (VRML) may be used. The book includes a password in some examples, and multiple users can enter the password and login to the same session. The virtual data is wirelessly communicated to the logged in display devices running a group read plug-in application of the dynamic printed material application 202. Grandmother 489 and grandson 484 are sharing a same application session much like gamers playing an online game but the grandmother 489 controls the action.

The grandmother 489 likes to see her grandson's expression when he sees the display of the virtual data such as the jack-o-lantern pumpkins $486_1$, $487_1$, $488_1$, and his reaction to the events and dialogue in the story. However, her grandson is only learning his letters and can't read such a book yet. The grandmother selects a reader role for herself from a menu and assigns her grandson a participant role. To interest children in reading, their direction is focused on the book by displaying virtual data when they look at the book. Display device systems 8 can detect other devices within a predetermined distance. For example, the display device systems may exchange identity tokens via a Bluetooth, WUSB, IR or RFID connection. The type and range of location proximity transceivers 144 can be selected to allow connections only within a predetermined distance. Location data such as from a GPS transceiver 144 or cell triangulation based on wireless transceiver signals 137 in combination with an application like Bump® may also be used for identifying devices within a predetermined distance of each other.

The virtual data is activated by eye gaze on a certain portion of the content of the story by the reader. The story is a work, and the content is on page 485 of the printed content item which is the book 490. The grandmother holds the book on her lap, and the reading angle does not satisfy the comfort criteria. However, the book is a stage from which virtual data emanates when a participant like the grandson 484 views it in the field of view of his display device system 8 and the eye gaze of the reader activates virtual content or data.

The process of FIG. 13A detects the uncomfortable reading position for the grandmother. As discussed further below in FIG. 15, her looking up from the book repeatedly may also trigger a follow-me task. A virtual version $485_2$ of the printed page $485_1$ is projected into the grandmother's eyes so that the virtual page, and any adjusted size of font or contrast for the virtual page, appears at a reading comfortable zone in her display. Her gaze duration on the content triggering the virtual pumpkins in the virtual page $485_2$ also triggers the virtual pumpkins $486_1$, $487_1$ and $488_1$ to appear for her grandson participant to appear to be floating out of the physical page $485_1$ when he looks at the book. In her display, the grandmother sees virtual pumpkins $486_2$, $487_2$ and $488_2$ from her perspective. Also due to the process example of FIG. 15, the virtual page $485_2$ is placed so she can comfortably read it. Another criteria for placement is not blocking a participant in the field of view as space allows. Appearance layout changes discussed below can also be used to accommodate keeping participants in view.

If the physical book is still within the field of view of the grandmother's display device, the dynamic application 202 takes action responsive to the grandmother's physical action with respect to the physical book, e.g. turning a page, as well as with respect to the virtual version page $485_2$ currently displayed.

FIG. 15 is a flowchart of an embodiment of a method for providing a virtual version of printed content which is linked to the user field of view. In step 502, responsive to a triggering event, a follow the user task of the dynamic printed material application 202 is triggered. An example of a triggering event is detecting a number of times a section of printed material is moving in and out of the field of view of the display device 2. Some other examples of a triggering event are user input requesting the follow the user task such as a predefined or user defined gesture or a spoken command like "follow me."

In step 504, the dynamic printed material application 202 determines whether an electronic version of the printed content item including printed material the user is viewing is available. If so, the dynamic application 202 can load at least a section of the printed content item into memory to be available as the user reads furthers and advances in the content embodied in the printed material. If an electronic version is available, the dynamic application 202 in step 514 displays image data including content of a printed content selection at a position in the field of view independent of the position of the printed content item. Particularly, in an example where the user moving his or her head position back and forth has triggered the follow me task, the dynamic application 202 selects a section of the printed content item the user has been focusing on as the printed content selection if gaze duration data or gesture or voice data has not affirmatively indicated a content selection. In step 516 display of the image data responsive to physical action input of the user with respect to the virtual version is updated. If the printed content item is still within the field of view, the dynamic application 202 responds to both physical action user input with respect to the printed item version and the virtual version.

Physical action user input may include gestures interacting with the virtual object such as pushing a virtual page around in the field of view, and pinning it to a "position" outside the field of view which is tracked by the dynamic application 202.

If the user moves her head to look at the "position," the application 202 causes the virtual page to reappear. For example, a cook following a recipe may use hand motions to push a recipe in and out of view as she performs the different steps of the recipe.

Optionally, in step 518, the dynamic application updates display of the image data responsive to layout change requests of the user. An example of a layout change request is to make the virtual content appear on a transparent sheet of paper and increase the spacing between the text so the user can see through the virtual content. Voice commands may request transparency. Or the user, may increase separation between portions of the text to create a see-through window in which to look at what he or she is working on. A stretching gesture with both hands pulling a virtual page in opposite directions may adjust the spacing. A mechanic working under a car may have a transparent version of a manual page with a window he has inserted by a gesture of a flat hand pushing down a section of the page, and then pushing up another section of the page so he can see in between. Another example of a gesture could also be two flat hands pushing the page portions, e.g. paragraphs, apart.

In the case where an electronic version of the printed content item is now available, in step 506, the dynamic application 202 stores image data of the section of printed content selection currently in the field of view, and in step 508 outputs instructions, e.g. audio or projected by the display device, requesting the user to look at one or more sections of the printed content item including content to be available in the current reading session. For example, before going under the car and starting work, the mechanic may look at the pages in the manual for the car pertinent to his repair. The dynamic application 202 in steps 510 and 512 captures and stores image data of each of the one or more sections while the respective section is in the field of view of the outward facing cameras and then proceeds to step 514. In one sense, the dynamic application 202 makes a photocopy of the pages looked at by the user.

Tasks performed for a physical content selection can also be performed for the virtual version. Resulting virtual data from any task performance can be stored and viewed later when again looking at the physical content selection as well.

FIG. 16 is a block diagram of one embodiment of a computing system that can be used to implement one or more network accessible computing systems 12 which may host at least some of the software components of computing environment 54 or other elements depicted in FIG. 3. With reference to FIG. 16, an exemplary system for implementing the invention includes a computing device, such as computing device 800. In its most basic configuration, computing device 800 typically includes one or more processing units 802 and may include different types of processors as well such as central processing units (CPU) and graphics processing units (GPU). Computing device 800 also includes memory 804. Depending on the exact configuration and type of computing device, memory 804 may include volatile memory 805 (such as RAM), non-volatile memory 807 (such as ROM, flash memory, etc.) or some combination of the two. This most basic configuration is illustrated in FIG. 16 by dashed line 806. Additionally, device 800 may also have additional features/functionality. For example, device 800 may also include additional storage (removable and/or non-removable) including, but not limited to, magnetic or optical disks or tape. Such additional storage is illustrated in FIG. 16 by removable storage 808 and non-removable storage 810.

Device 800 may also contain communications connection(s) 812 such as one or more network interfaces and transceivers that allow the device to communicate with other devices. Device 800 may also have input device(s) 814 such as keyboard, mouse, pen, voice input device, touch input device, etc. Output device(s) 816 such as a display, speakers, printer, etc. may also be included. All these devices are well known in the art and need not be discussed at length here.

As discussed above, the processing unit 4 may be embodied in a mobile device 5. FIG. 17 is a block diagram of an exemplary mobile device 900 which may operate in embodiments of the technology. Exemplary electronic circuitry of a typical mobile phone is depicted. The phone 900 includes one or more microprocessors 912, and memory 910 (e.g., non-volatile memory such as ROM and volatile memory such as RAM) which stores processor-readable code which is executed by one or more processors of the control processor 912 to implement the functionality described herein.

Mobile device 900 may include, for example, processors 912, memory 1010 including applications and non-volatile storage. The processor 912 can implement communications, as well as any number of applications, including the applications discussed herein. Memory 1010 can be any variety of memory storage media types, including non-volatile and volatile memory. A device operating system handles the different operations of the mobile device 900 and may contain user interfaces for operations, such as placing and receiving phone calls, text messaging, checking voicemail, and the like. The applications 930 can be any assortment of programs, such as a camera application for photos and/or videos, an address book, a calendar application, a media player, an internet browser, games, other multimedia applications, an alarm application, other third party applications like a skin application and image processing software for processing image data to and from the display device 2 discussed herein, and the like. The non-volatile storage component 940 in memory 910 contains data such as web caches, music, photos, contact data, scheduling data, and other files.

The processor 912 also communicates with RF transmit/receive circuitry 906 which in turn is coupled to an antenna 902, with an infrared transmitted/receiver 908, with any additional communication channels 960 like Wi-Fi, WUSB, RFID, infrared or Bluetooth, and with a movement/orientation sensor 914 such as an accelerometer. Accelerometers have been incorporated into mobile devices to enable such applications as intelligent user interfaces that let users input commands through gestures, indoor GPS functionality which calculates the movement and direction of the device after contact is broken with a GPS satellite, and to detect the orientation of the device and automatically change the display from portrait to landscape when the phone is rotated. An accelerometer can be provided, e.g., by a micro-electromechanical system (MEMS) which is a tiny mechanical device (of micrometer dimensions) built onto a semiconductor chip. Acceleration direction, as well as orientation, vibration and shock can be sensed. The processor 912 further communicates with a ringer/vibrator 916, a user interface keypad/screen, biometric sensor system 918, a speaker 920, a microphone 922, a camera 924, a light sensor 921 and a temperature sensor 927.

The processor 912 controls transmission and reception of wireless signals. During a transmission mode, the processor 912 provides a voice signal from microphone 922, or other data signal, to the RF transmit/receive circuitry 906. The transmit/receive circuitry 906 transmits the signal to a remote station (e.g., a fixed station, operator, other cellular phones, etc.) for communication through the antenna 902. The ringer/vibrator 916 is used to signal an incoming call, text message, calendar reminder, alarm clock reminder, or other notification to the user. During a receiving mode, the transmit/receive circuitry 906 receives a voice or other data signal from a remote station through the antenna 902. A received voice signal is provided to the speaker 920 while other received data signals are also processed appropriately.

Additionally, a physical connector 988 can be used to connect the mobile device 900 to an external power source, such as an AC adapter or powered docking station. The physical connector 988 can also be used as a data connection to a computing device. The data connection allows for operations such as synchronizing mobile device data with the computing data on another device.

A GPS receiver 965 utilizing satellite-based radio navigation to relay the position of the user applications is enabled for such service.

The example computer systems illustrated in the figures include examples of computer readable storage devices. Computer readable storage devices are also processor readable storage device. Such devices may include volatile and nonvolatile, removable and non-removable memory devices implemented in any method or technology for storage of information such as computer readable instructions, data structures, program modules or other data. Some examples of processor or computer readable storage devices are RAM, ROM, EEPROM, cache, flash memory or other memory technology, CD-ROM, digital versatile disks (DVD) or other optical disk storage, memory sticks or cards, magnetic cassettes, magnetic tape, a media drive, a hard disk, magnetic disk storage or other magnetic storage devices, or any other device which can be used to store the desired information and which can be accessed by a computer.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for making static printed content dynamic with virtual data using a near eye, mixed reality display device comprising:
    identifying a real printed content item in a field of view of a near eye, mixed reality display device;
    identifying user selection of a real printed content selection within the real printed content item based on physical action user input;
    determining a task requested for the real printed content selection based on physical action user input;
    performing the task; and
    displaying virtual data related to the real printed content selection in accordance with the task wherein the task further comprises displaying a virtual version of the real printed content selection at a first position in the field of view of the near-eye, mixed reality display device which is independent of a second position of the real printed content item with respect to the field of view of the display device, and updating display of the virtual version of the real printed content selection responsive to physical action input of the user.

2. The method of claim 1 wherein the task is bringing the printed content selection up-to-date which further comprises:
    identifying the printed content selection as being within an out-of-date section within the printed content item;
    retrieving virtual data with up-to-date information for the section including the printed content selection; and
    displaying the virtual data with up-to-date information in a position related to the position of the printed content selection.

3. The method of claim 1 wherein the task is an annotation task and performing the task further comprises:
    displaying a virtual key entry input device for the user;
    generating annotation data based on user data entry with the virtual key entry input device; and
    displaying the annotation data at a position indicated by physical action user input.

4. The method of claim 1 wherein the task is an annotation task and performing the requested task further comprises:
    the printed content selection is a first printed content selection;
    receiving user input indicating a physical action of the user requesting virtual data of the first printed content selection be made and designated as an annotation;
    identifying user selection of a second printed content selection as a selection to be annotated;
    receiving user input indicating a physical action of the user indicating a position for displaying the annotation made of the first printed content selection in relation to the second printed content selection; and
    displaying the annotation at the indicated position.

5. The method of claim 4 wherein the first printed content selection is handwritten text and the annotation made of the first printed content selection is in a computer standardized text data format.

6. The method of claim 1 wherein the task is a group read task and performing the group read task further comprises:
    receiving user input identifying a user associated with the mixed reality display device system as either a reader or a participant;
    responsive to the user input identifying the user as a reader, displaying a virtual version of the printed content item, and
    responding to physical action user input with respect to either the virtual version of the real printed content item or the real printed content item if the real printed content item is within the field of view of at least one camera of the display device; and
    responsive to the user input identifying the user as a participant, displaying virtual data in relation to the real printed content item in the field of view responsive to one or more notifications from another near eye, mixed reality display device of the reader.

7. The method of claim 1 wherein displaying a virtual version of the real printed content selection at a first position in the field of view of the near-eye, mixed reality display device which is independent of a second position of the real printed content selection with respect to the field of view of the display device further comprises:
    determining whether an electronic version of the printed content item is available;
    responsive to the electronic version of the printed content item being available, loading at least a section of the printed content item including the printed content selection into a memory accessible by a processor of the near-eye, mixed reality display device and displaying image data of the electronic version the printed content selection;
    responsive to the electronic version of the printed content item not being available,
    storing image data of the printed content selection currently in the user field of view, outputting instructions to the user via the display device to look at one or more sections of the printed content item including content to be available in a current reading session;

capturing image data of each of the one or more sections while the respective section is in the field of view of outward facing cameras of the display device system; and storing the captured image data.

8. The method of claim 1 further comprising:

updating display of the image data responsive to layout change requests of the user.

9. The method of claim 1 wherein the near-eye, mixed reality display device is a see-through, near-eye, mixed reality display device.

10. One or more processor readable non-volatile storage devices having instructions encoded thereon for causing one or more processors to execute a method for making static printed content dynamic with virtual data using a near eye, mixed reality display device, the method comprising:

identifying a printed content item in a field of view of a near eye, mixed reality display device;

identifying user selection of a printed content selection within the printed content item based on physical action user input;

determining a task for the printed content selection based on physical action user input;

performing the task; and displaying virtual data related to the printed content selection in accordance with the task wherein the task is a group read task and performing the group read task further comprises:

receiving user input identifying a user associated with the mixed reality display device system as either a reader or a participant;

responsive to the user input identifying the user as a reader, displaying a virtual version of the printed content item, and responding to physical action user input with respect to either the virtual version of the printed content item or the printed content item if the printed content item is within the field of view of cameras of the display device system, and responsive to the user input identifying the user as a participant, displaying virtual data in relation to the printed content item in the field of view responsive to one or more notifications from another near eye, mixed reality display device of the reader.

11. The one or more processor readable non-volatile storage devices of claim 10 wherein the near-eye, mixed reality display device is a see-through, near-eye, mixed reality display device.

12. A near-eye, mixed reality display device system for making static printed material dynamic comprising:

a respective display for each eye positioned by a support structure;

at least one outward facing camera positioned on the support structure for capturing image data in a field of view of the respective displays;

one or more software controlled processors communicatively coupled to the at least one outward facing camera for receiving image data;

the one or more software controlled processors being operable for identifying a real printed content item in the field of view of the respective displays;

the one or more software controlled processors being communicatively coupled to one or more natural user input capture devices for receiving data for identifying physical action user input;

the one or more software controlled processors being operable for identifying physical action user input indicating user selection of a real printed content selection within the real printed content item based on the data received from the one or more natural user input capture devices;

the one or more software controlled processors being operable for identifying physical action user input indicating a task is requested for the real printed content selection;

an image generation unit communicatively coupled to the one or more software processors and being operable for control by the one or more software processors;

the one or more software controlled processors controlling performance of the task; and the image generation under control of the one or more software controlled processors being operable for displaying virtual data related to the real printed content selection in accordance with the task wherein the task further comprises the image generation under control of the one or more software controlled processors being operable for displaying a virtual version of the real printed content selection at a first position in the field of view of the near-eye, mixed reality display device which is independent of a second position of the real printed content item with respect to the field of view of the display device, and updating display of the virtual version of the real printed content selection responsive to physical action input of the user.

13. The system of claim 12 wherein the respective display for each eye positioned by a support structure is a see-through display.

* * * * *